(12) United States Patent
Okada

(10) Patent No.: US 7,911,707 B2
(45) Date of Patent: Mar. 22, 2011

(54) ZOOM LENS AND IMAGE PICKUP APPARATUS HAVING THE SAME

(75) Inventor: Takashi Okada, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/511,946

(22) Filed: Jul. 29, 2009

(65) Prior Publication Data

US 2010/0053766 A1 Mar. 4, 2010

(30) Foreign Application Priority Data

Sep. 1, 2008 (JP) .................................. 2008-223399

(51) Int. Cl.
*G02B 15/14* (2006.01)
*H04N 5/262* (2006.01)

(52) U.S. Cl. ...................... 359/680; 359/686; 348/240.3

(58) Field of Classification Search ............... 348/240.3; 359/680, 682, 683, 686, 693
See application file for complete search history.

(56) References Cited

U.S. PATENT DOCUMENTS

| 5,710,669 | A | 1/1998 | Endo | |
|---|---|---|---|---|
| 7,535,650 | B2* | 5/2009 | Ohashi | 359/676 |
| 7,599,123 | B2* | 10/2009 | Yamamoto | 359/686 |
| 7,639,430 | B2* | 12/2009 | Shirasuna | 359/686 |
| 7,777,967 | B2* | 8/2010 | Hirakawa | 359/684 |
| 2010/0033848 | A1* | 2/2010 | Hatada | 359/753 |

FOREIGN PATENT DOCUMENTS

| JP | 2001-042217 A | 2/2001 |
|---|---|---|
| JP | 2002-287031 A | 10/2002 |

* cited by examiner

*Primary Examiner* — David N Spector
(74) *Attorney, Agent, or Firm* — Canon U.S.A., Inc. I.P. Division

(57) ABSTRACT

A zoom lens includes, in order from an object side to an image side, a first lens unit having a negative refractive power, a second lens unit having a positive refractive power, a third lens unit having a negative refractive power, and a fourth lens unit having a positive refractive power. In the zoom lens, an interval between every adjacent ones of the first through fourth lens units varies during zooming, the second lens unit includes at least one negative lens, and the third lens unit includes at least one positive lens. An Abbe number and a relative partial dispersion of a material of the at least one negative lens (vd2N, θgF2N) and an Abbe number and a relative partial dispersion of a material of the at least one positive lens (vd3P, θgF3P) are appropriately set.

6 Claims, 17 Drawing Sheets

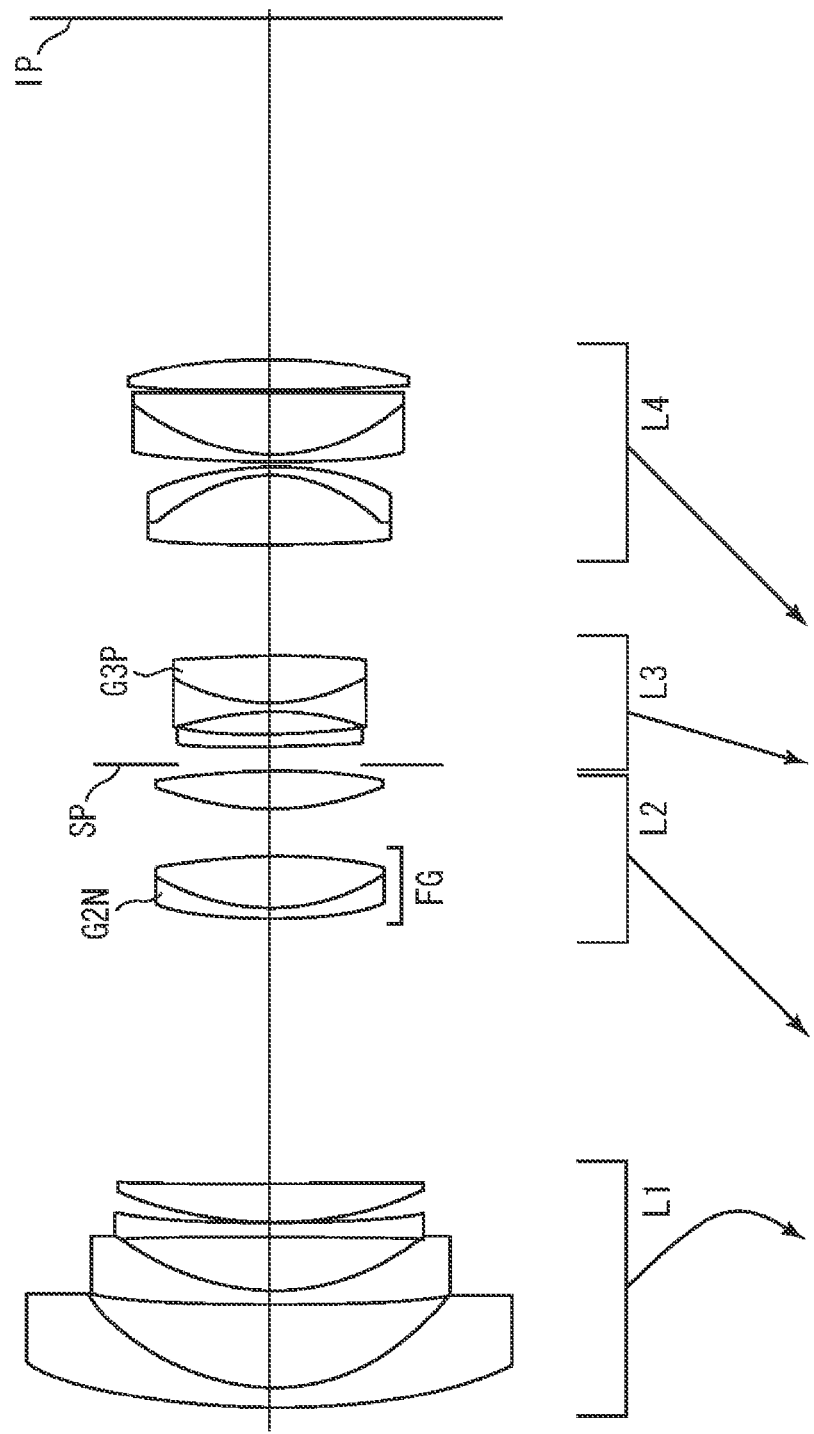

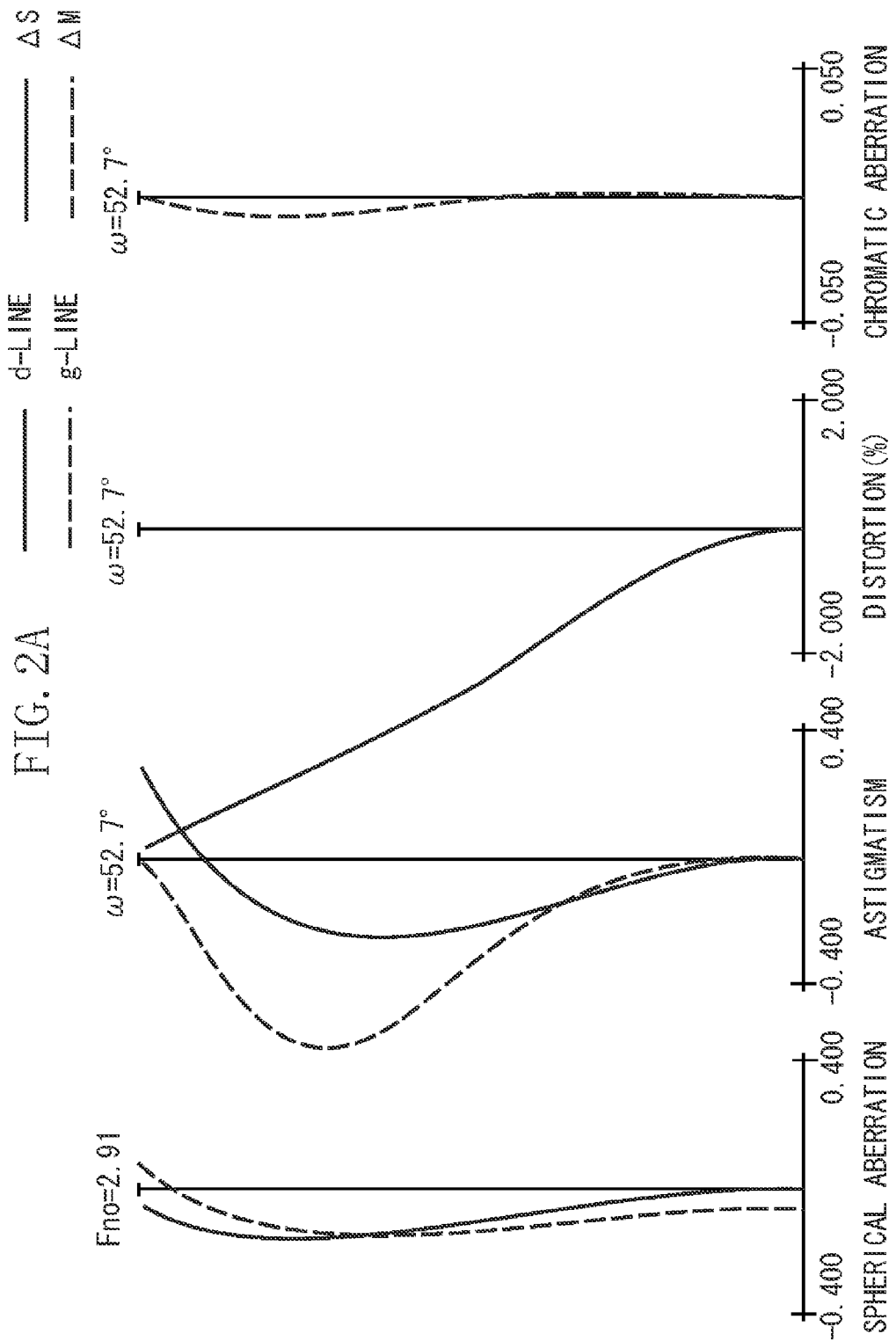

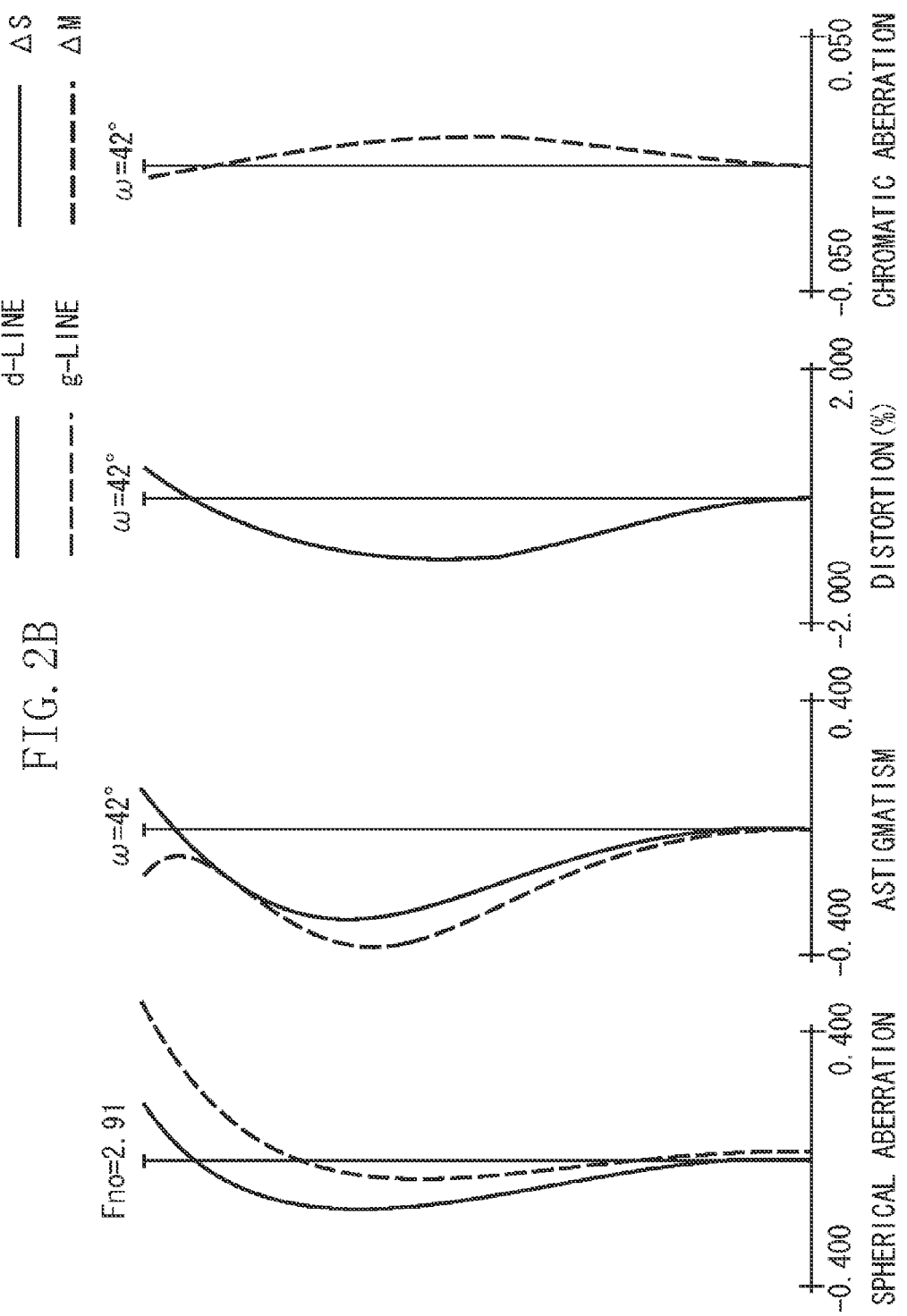

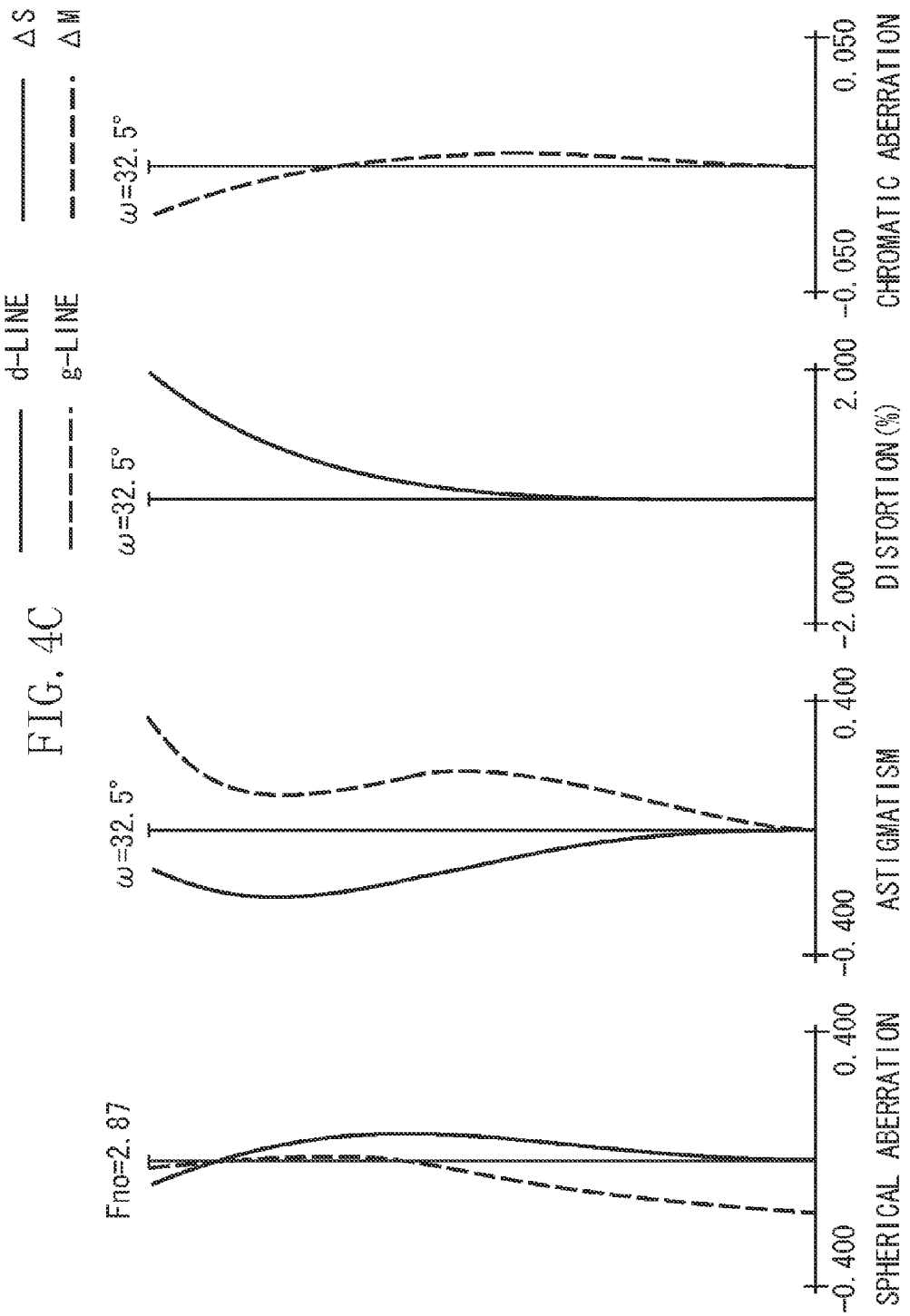

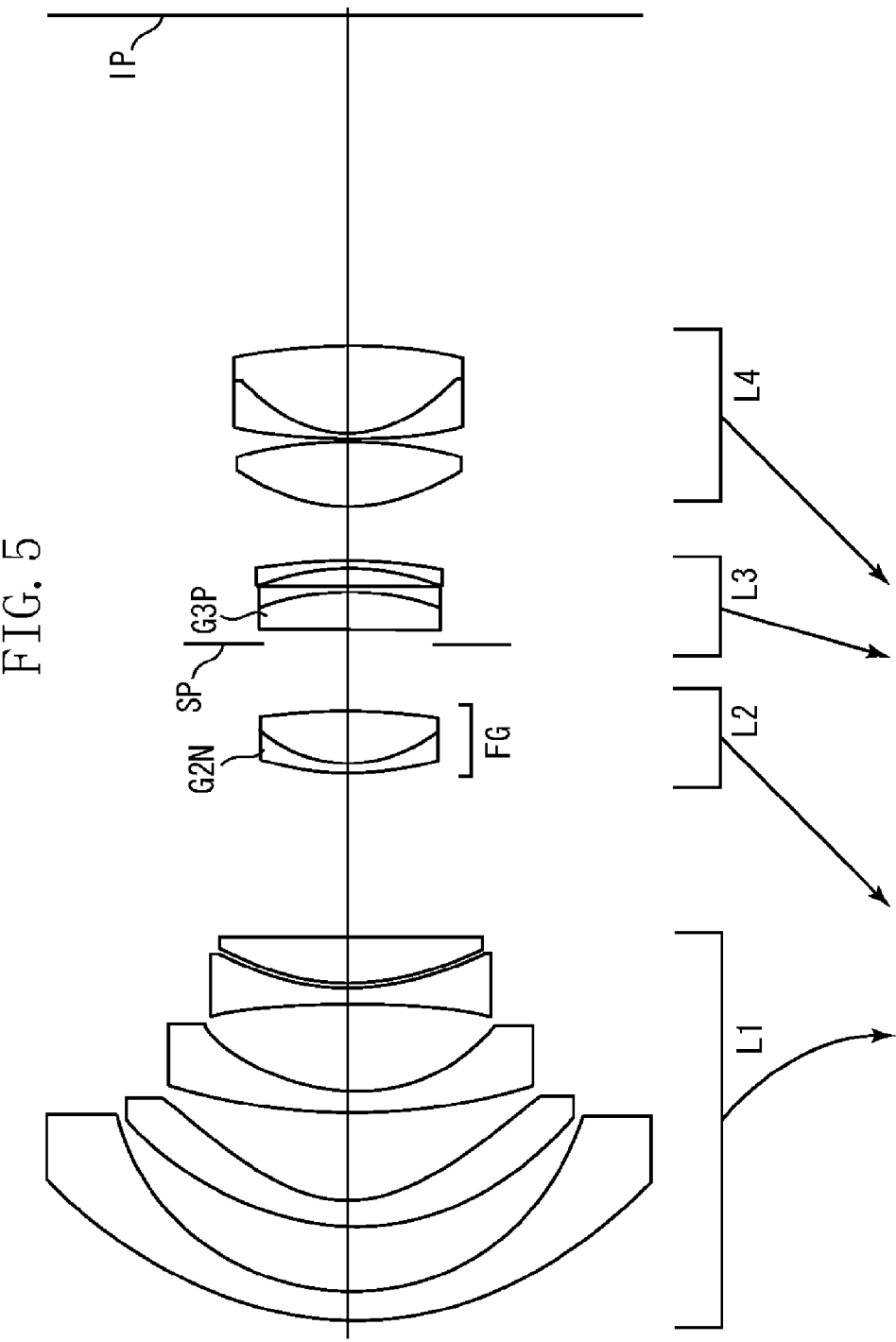

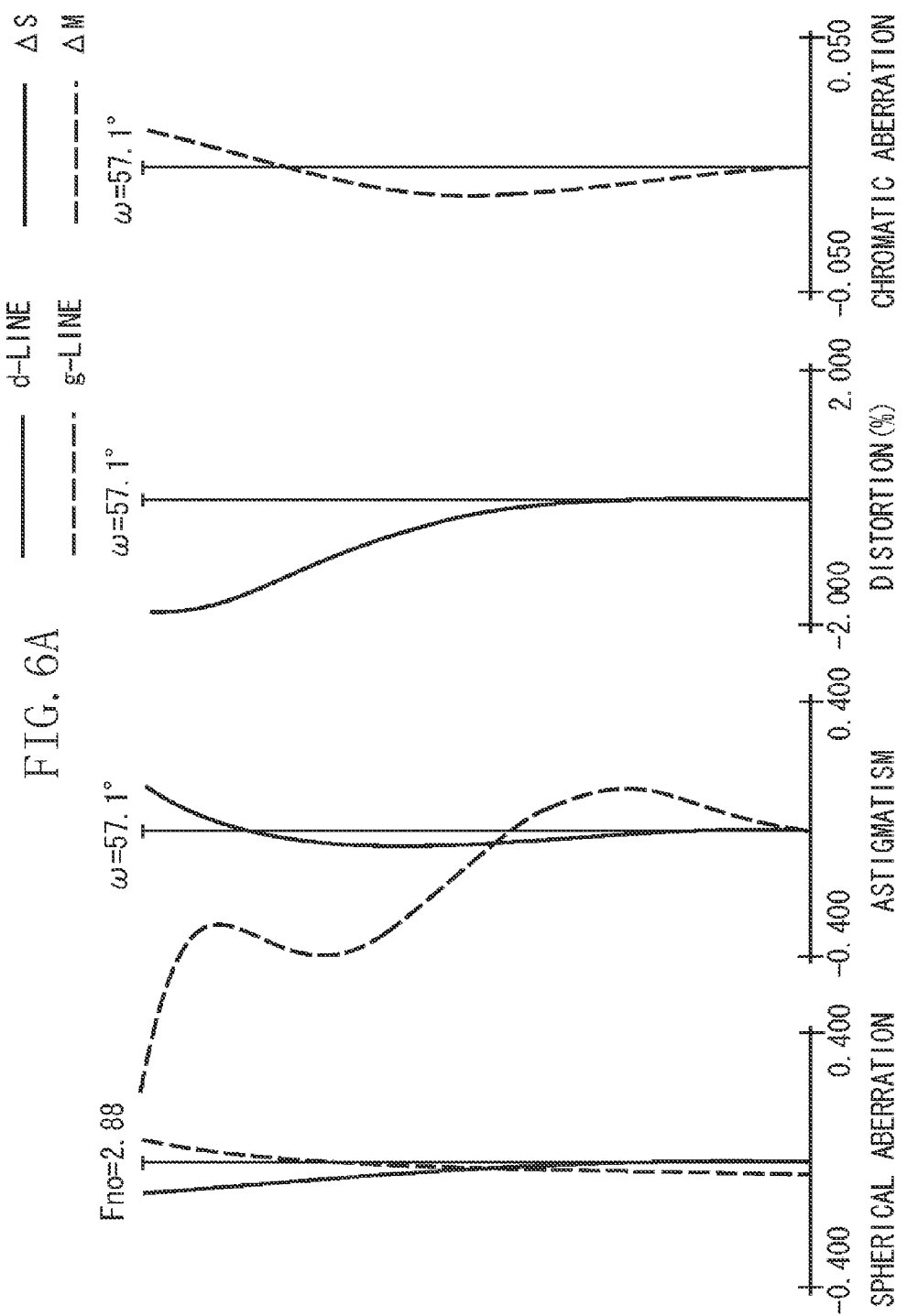

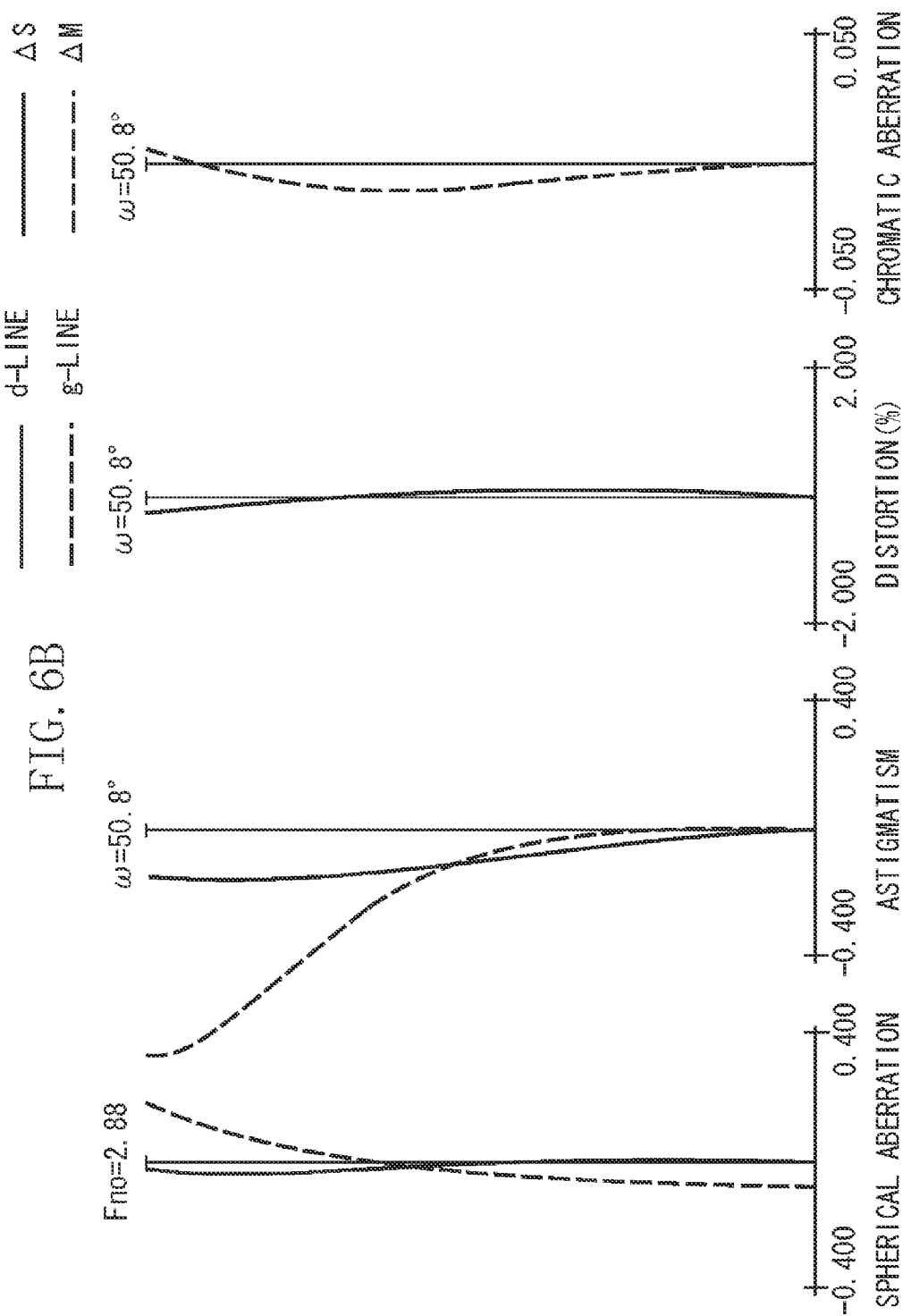

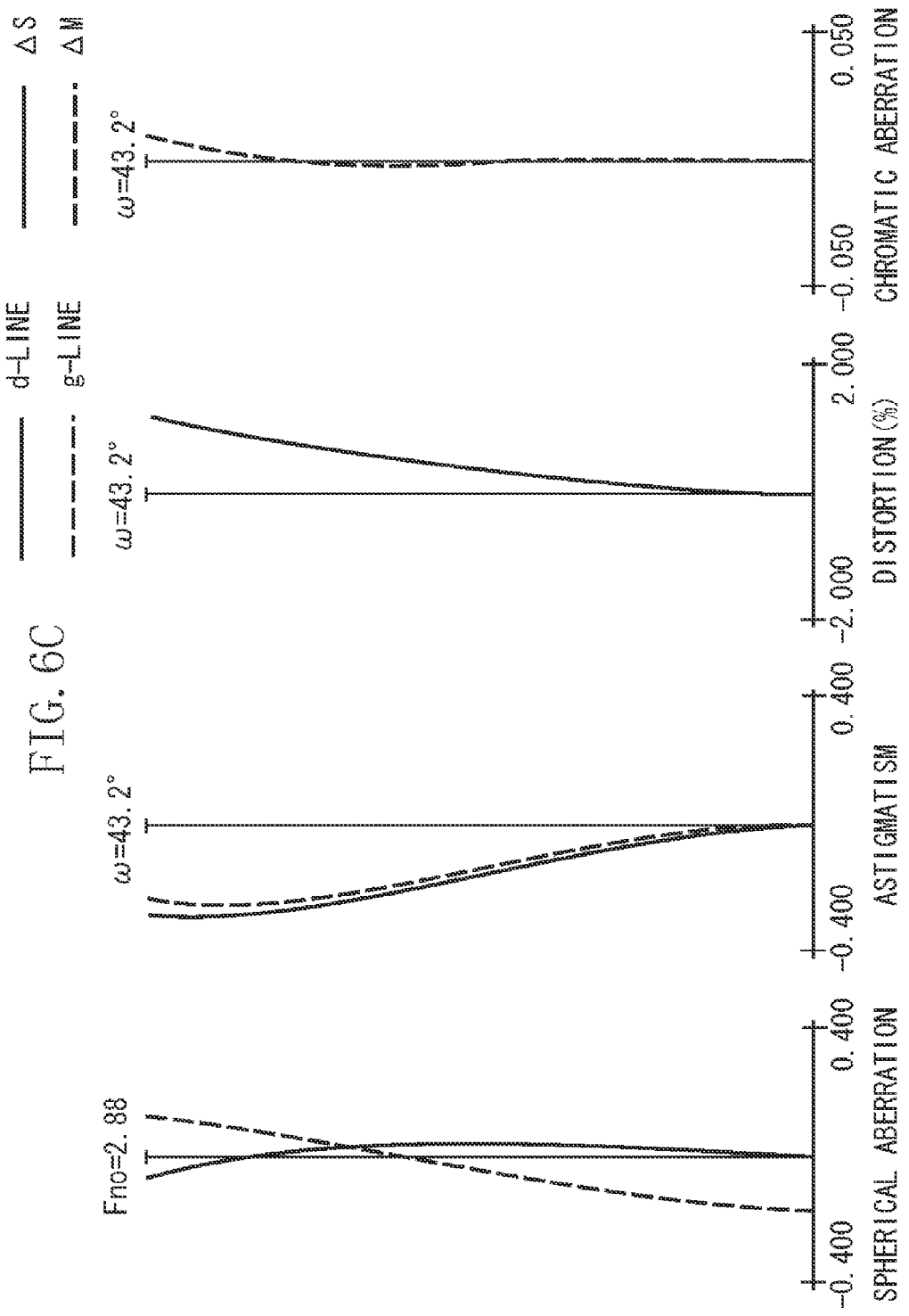

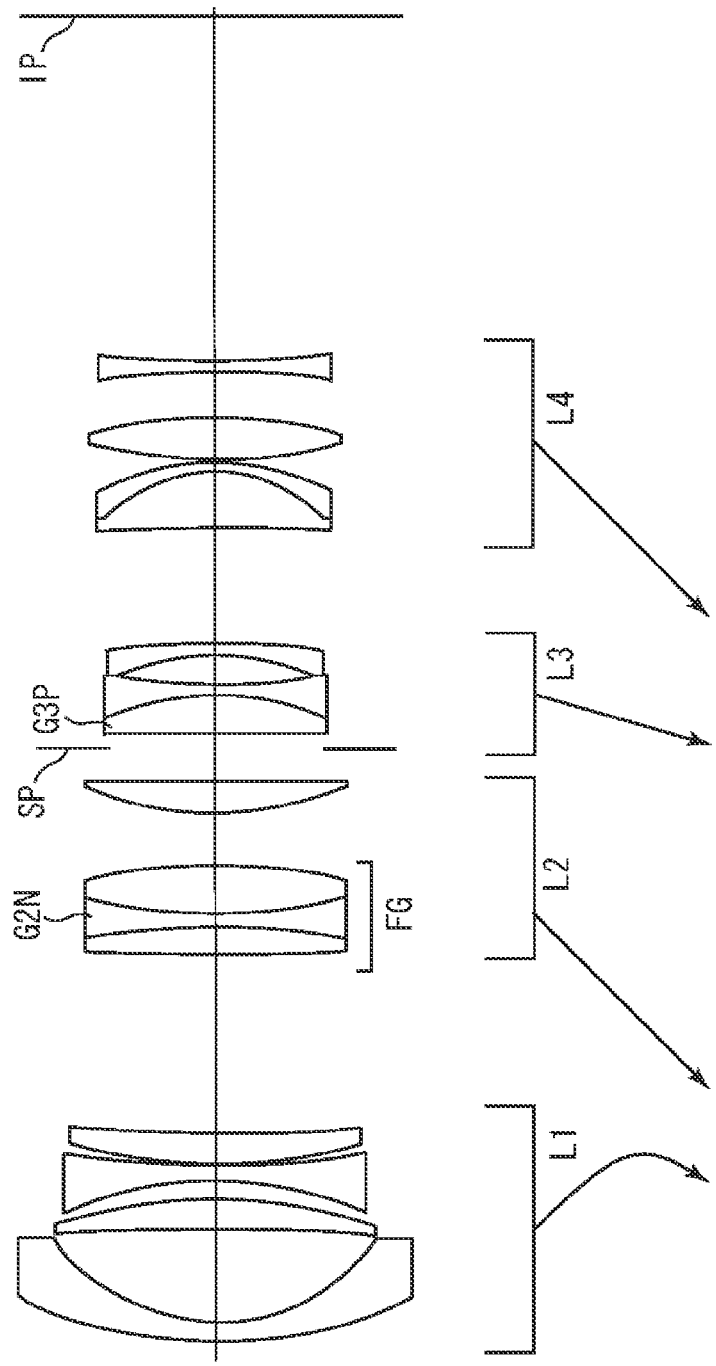

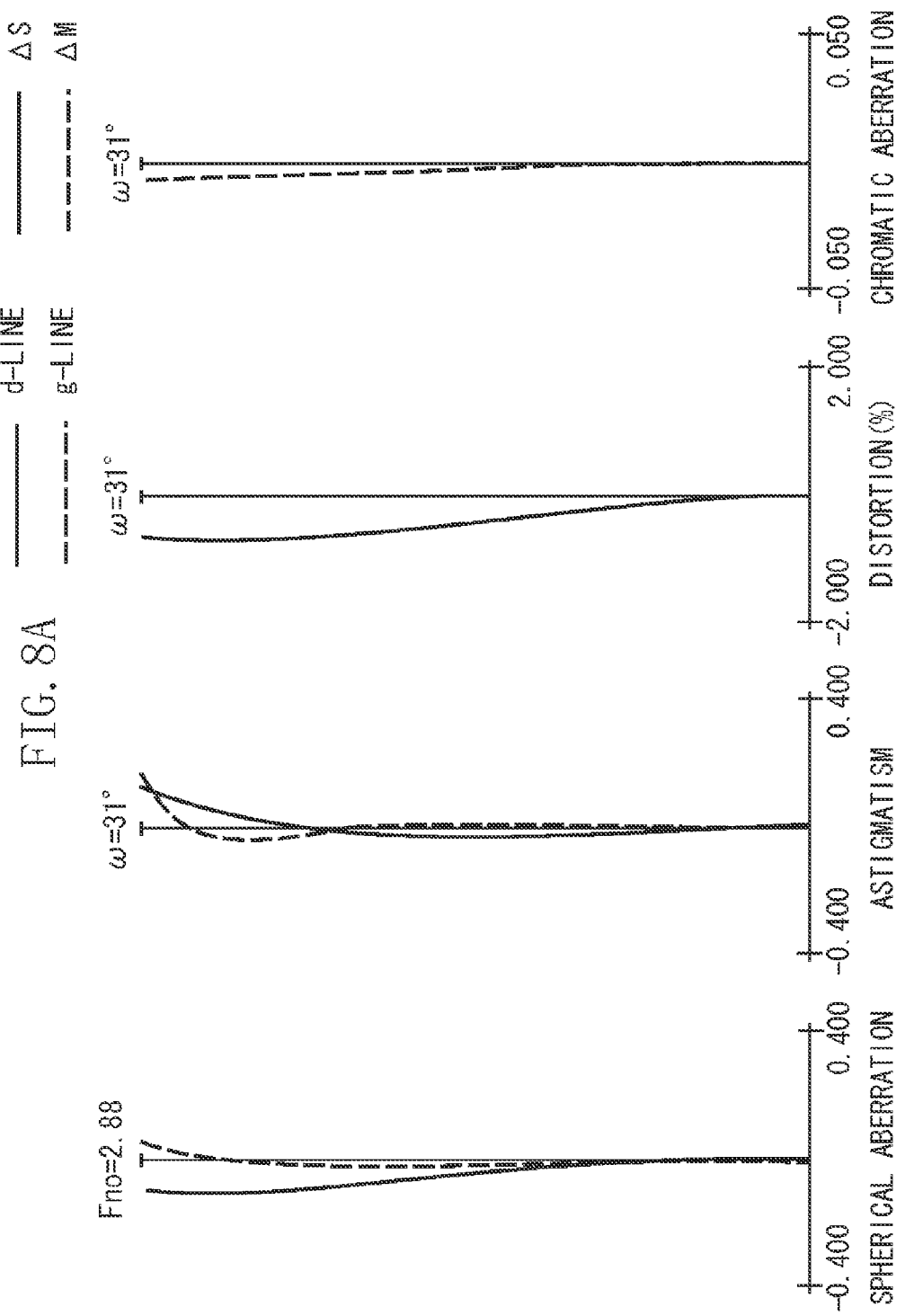

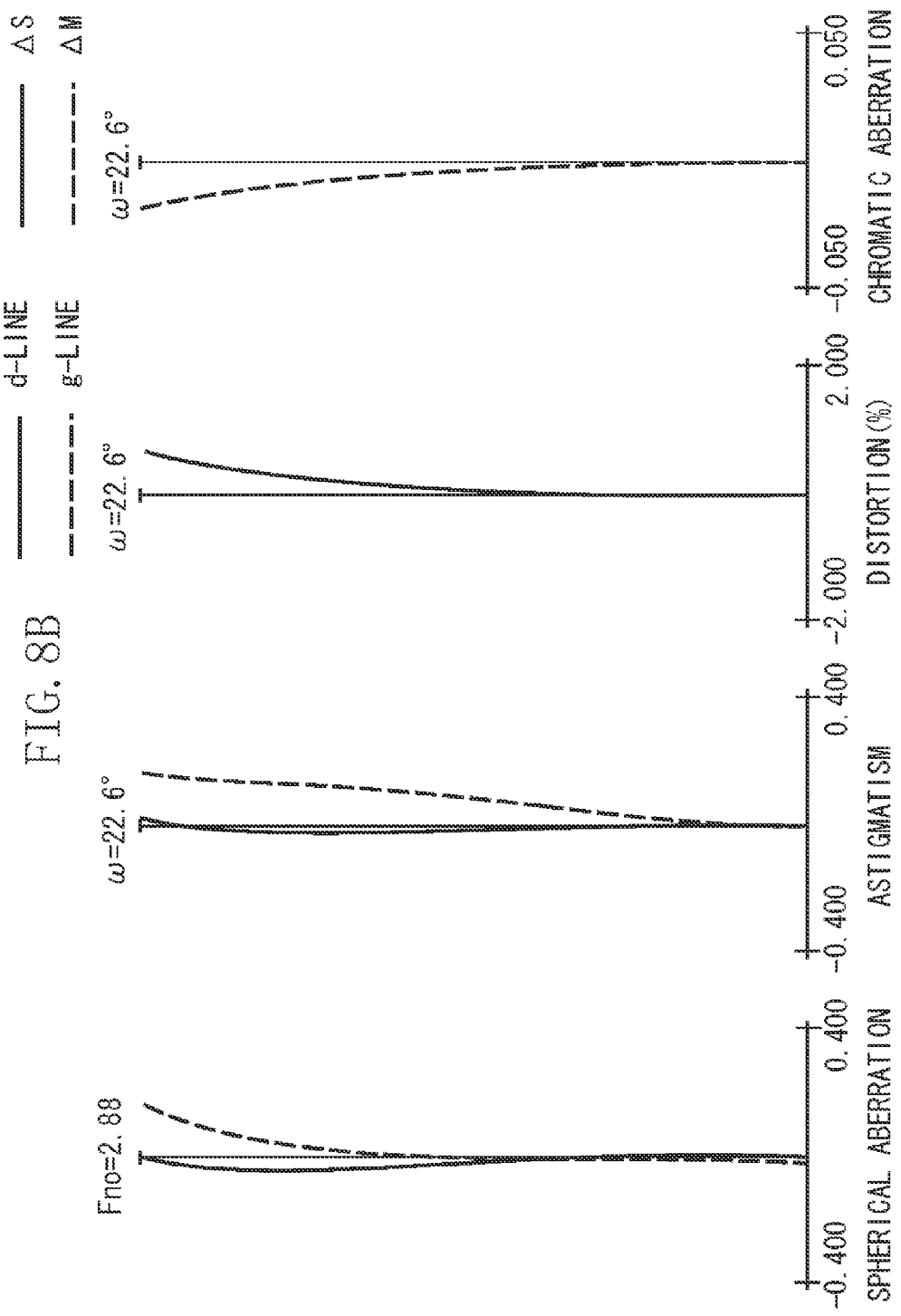

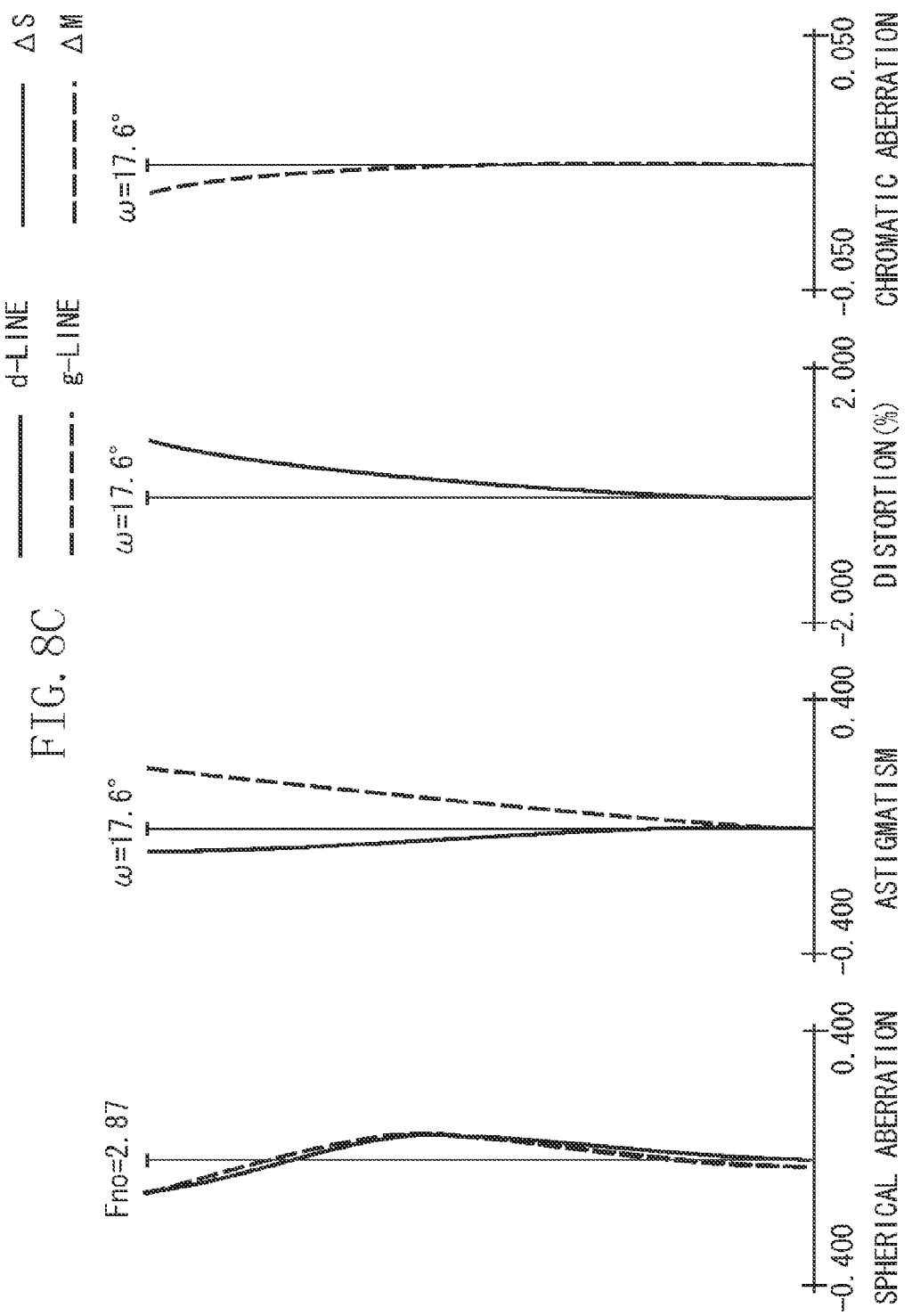

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens. More specifically, the present invention relates to a zoom lens useful as a photographic (shooting) optical system of an image pickup apparatus, such as a digital camera, a video camera, a television camera, and a silver-halide film camera.

2. Description of the Related Art

In recent years, an image sensor used in an image pickup apparatus, such as a digital camera or a video camera, has an increased number of pixels.

It is desired by the market that a photographic lens used in an image pickup apparatus including an image sensor having an increased number of pixels is a zoom lens having a high resolution and can effectively correct monochromatic (short wavelength) aberration, such as spherical aberration and coma, and chromatic aberration so that the color of an image does not blur under an illumination by a white light source.

In addition, it is desired that a photographic lens used in an image pickup apparatus including an image sensor having an increased number of pixels is a zoom lens having a wide angle of view.

A conventional negative-lead type zoom lens, which is a zoom lens having a wide angle of view, includes a lens unit having a negative refractive power on the object side. A negative-lead type zoom lens like this enables shooting a closest-distance object at a relatively short distance. Accordingly, the above-described negative-lead type zoom lens can have a long back focal length.

Japanese Patent Application Laid-Open Nos. 2002-287031 and 2001-042217 and U.S. Pat. No. 5,710,669 each discuss a negative-lead type zoom lens for a single-lens reflex camera composed of four lens units having, in order from the object side to the image side, negative, positive, negative, and positive refractive powers, each of which is movable during zooming.

In general, the negative-lead type zoom lens is useful for enlarging the angle of view but the lens configuration is remarkably asymmetric.

In particular, in the negative-lead type zoom lens, a lens unit having a negative refractive power is located at a position closest to the object side of all lens units and thus the arrangement of refractive powers is asymmetric with respect to the aperture stop. Accordingly, a large amount of chromatic aberration of magnification (longitudinal chromatic aberration) may occur at the wide-angle end, and a large amount of axial chromatic aberration and chromatic aberration of magnification (lateral chromatic aberration) may occur at the telephoto end.

Accordingly, it is significant for a negative-lead type zoom lens to be capable of effectively correcting chromatic aberration of both a primary spectrum and a secondary spectrum. More specifically, it is significant for each lens unit of the negative-lead type zoom lens to be capable of effectively correcting chromatic aberration.

In general, in order to correct negative chromatic aberration of magnification, it is useful to use a positive lens made of a low-dispersion material having anomalous partial dispersion, such as fluorite in a lens unit located at a position closer to the back side of the zoom lens than an aperture stop, whose height of incidence (the distance from the optical axis) h of a paraxial chief ray into a lens surface is relatively high.

When the above-described positive lens is used, it is necessary to increase the positive refractive power of the positive lens. However, if the positive refractive power of the positive lens is increased, a large amount of aberrations other than chromatic aberration may occur. Accordingly, in this case, it becomes difficult to effectively correct the aberrations.

In order to effectively reduce chromatic aberration, correct various aberrations other than chromatic aberration, and achieve a high optical performance in the entire zoom range by using an optical material having a low dispersion and anomalous dispersion characteristic, it is significant to appropriately set each lens unit constituting a zoom lens. More specifically, it is particularly significant to appropriately arrange a lens having an anomalous dispersion characteristic in a lens unit.

For example, in a zoom lens including lens units having, in order from the object side to the image side, negative, positive, negative, and positive refractive powers, it is significant to appropriately set an Abbe number and a relative partial dispersion of a material of a lens constituting the second or third lens unit.

If the lens units are not appropriately configured as described above, a large amount of chromatic aberration of magnification may occur at the wide-angle end. In addition, chromatic aberration of magnification may greatly vary in the entire zoom range. Accordingly, it may become difficult to effectively correct chromatic aberration of magnification.

SUMMARY OF THE INVENTION

According to an aspect of the present invention, a zoom lens includes, in order from an object side to an image side a first lens unit having a negative refractive power, a second lens unit having a positive refractive power, a third lens unit having a negative refractive power, and a fourth lens unit having a positive refractive power. An interval between every adjacent ones of the first through fourth lens units varies during zooming, the second lens unit includes at least one negative lens, and the third lens unit includes at least one positive lens. An Abbe number and a relative partial dispersion of a material of the at least one negative lens (vd2N, θgF2N) and an Abbe number and a relative partial dispersion of a material of the at least one positive lens (vd3P, θgF3P) satisfy the following conditions:

$$0.79 < \theta gF2N - (1.0\times10^{-4}\times vd2N^2 - 9.1\times10^{-3}\times vd2N) < 0.86$$

$$10 < vd2N < 30$$

$$0.79 < \theta gF3P - (1.0\times10^{-4}\times vd3P^2 - 9.1\times10^{-3}\times vd3P) < 0.86$$

$$10 < vd3P < 30.$$

According to an exemplary embodiment of the present invention, a zoom lens having a wide angle of view and a high optical performance in the entire zoom range can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention, together with the description, serve to explain the principles of the present invention.

FIG. 1 is an optical cross section of a zoom lens according to a first exemplary embodiment of the present invention.

FIGS. 2A through 2C are aberration charts of the zoom lens according to the first exemplary embodiment of the present invention.

FIGS. 4A through 4C are aberration charts of the zoom lens according to the second exemplary embodiment of the present invention.

FIG. 5 is an optical cross section of a zoom lens according to a third exemplary embodiment of the present invention.

FIGS. 6A through 6C are aberration charts of the zoom lens according to the third exemplary embodiment of the present invention.

FIG. 7 is an optical cross section of a zoom lens according to a fourth exemplary embodiment of the present invention.

FIGS. 8A through 8C are aberration charts of the zoom lens according to the fourth exemplary embodiment of the present invention.

DETAILED DESCRIPTION OF THE EMBODIMENTS

Figure 2C:
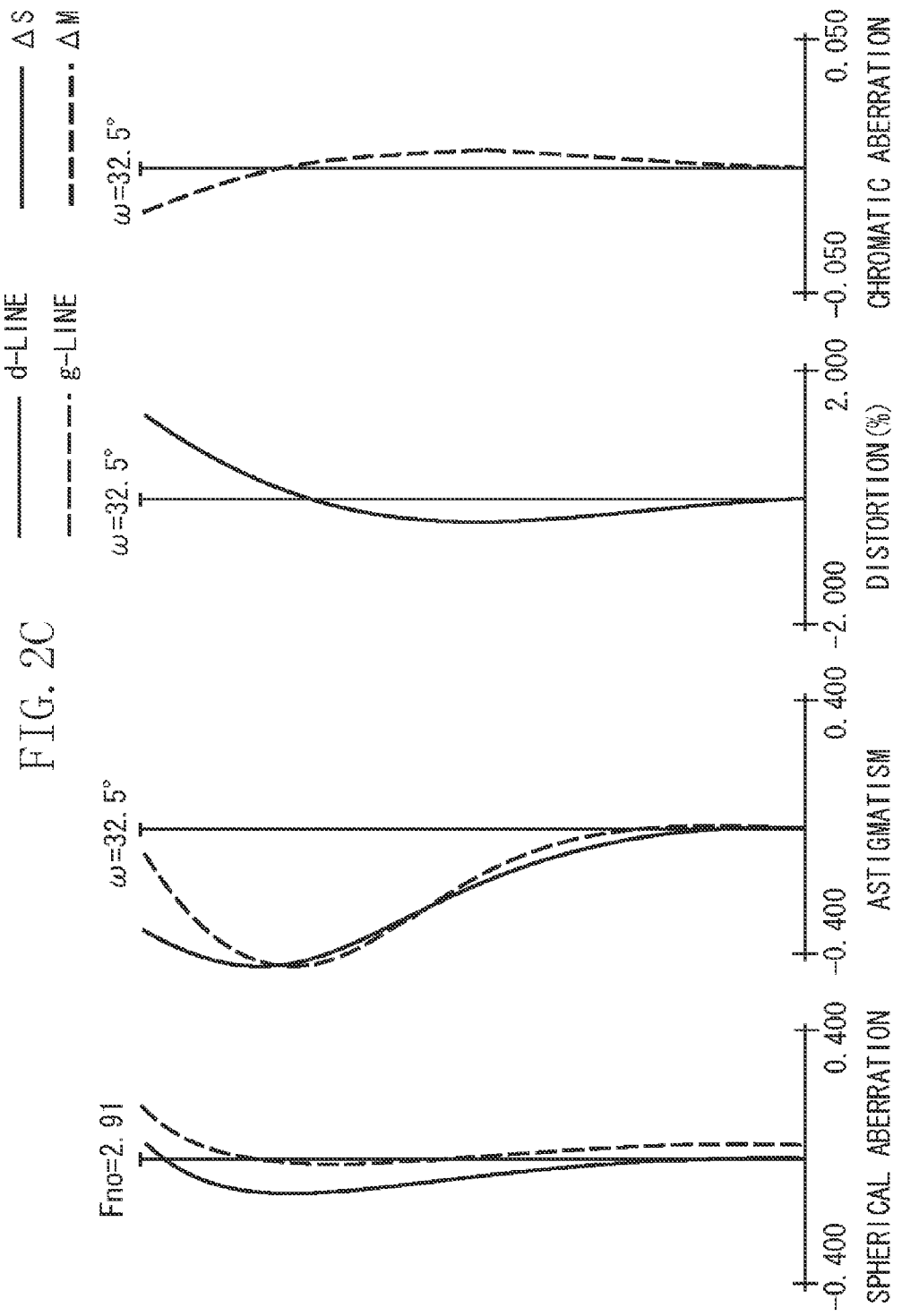

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

A zoom lens according to an exemplary embodiment of the present invention includes, in order from the object side to the image side, a first lens unit having a negative refractive power, a second lens unit having a positive refractive power, an aperture stop, a third lens unit having a negative refractive power, and a fourth lens unit having a positive refractive power. The interval between every adjacent ones of the first through fourth lens units varies during zooming.

The second lens unit includes at least one negative lens. The third lens unit includes at least one positive lens. A material of the at least one negative lens and a material of the at least one positive lens can satisfy conditions (1a), (2a), (1b), and (2b). The conditions (1a), (2a), (1b), and (2b) will be described in detail below.

FIG. 1 is a lens cross section of a zoom lens according to a first exemplary embodiment of the present invention at a wide-angle end (short focal length end). FIGS. 2A through 2C are aberration charts of the zoom lens according to the first exemplary embodiment at the wide-angle end, a middle focal length, and a telephoto end (long focal length end), respectively, when focusing on an infinitely-distant object.

Figure 3:
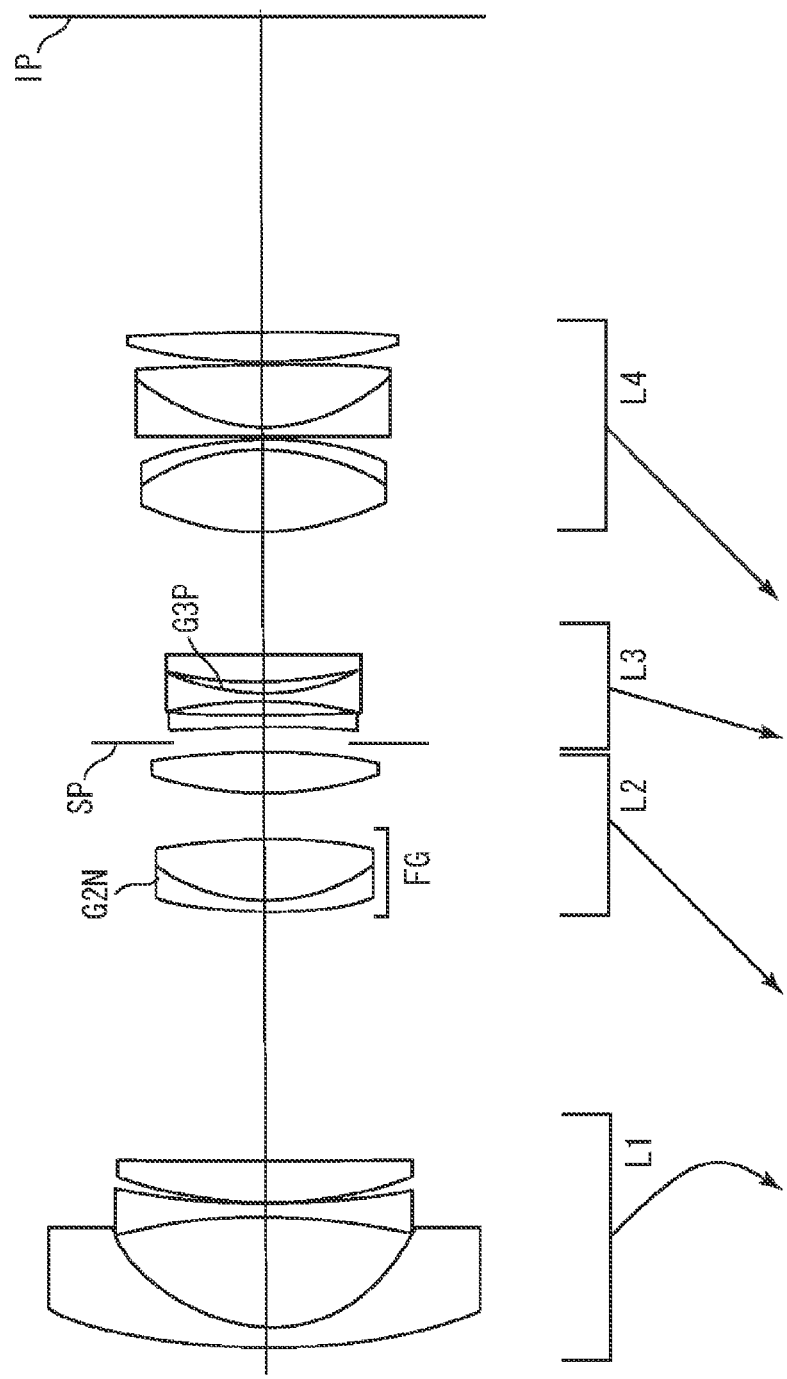
FIG. 3 is an optical cross section of a zoom lens according to a second exemplary embodiment of the present invention.
Figure 4A:
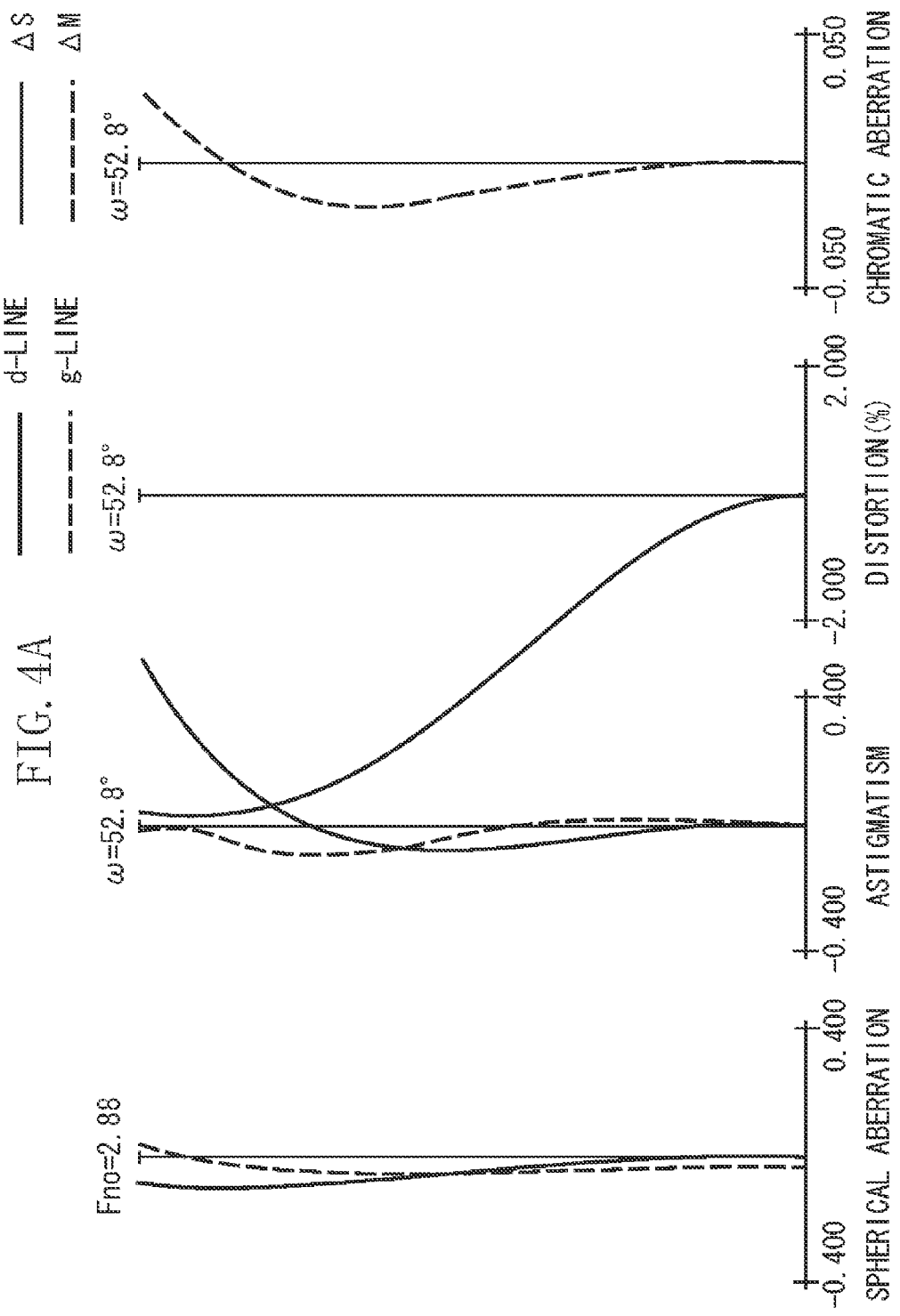
Figure 4B:
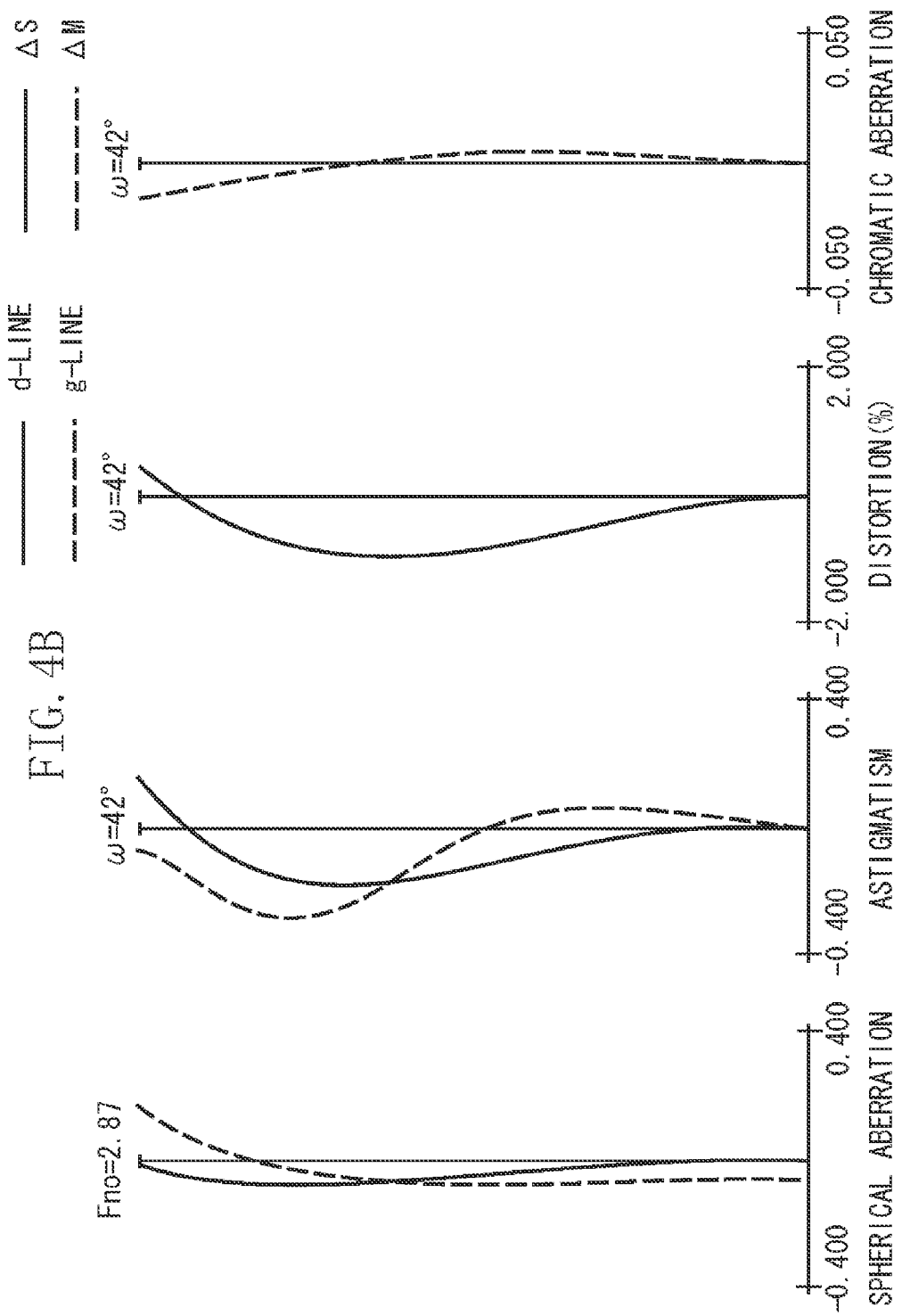

FIG. 3 is a lens cross section of a zoom lens according to a second exemplary embodiment of the present invention at the wide-angle end. FIGS. 4A through 4C are aberration charts of the zoom lens according to the second exemplary embodiment at the wide-angle end, a middle focal length, and the telephoto end, respectively, when focusing on an infinitely-distant object.

FIG. 5 is a lens cross section of a zoom lens according to a third exemplary embodiment of the present invention at the wide-angle end. FIGS. 6A through 6C are aberration charts of the zoom lens according to the third exemplary embodiment at the wide-angle end, a middle focal length, and the telephoto end, respectively, when focusing on an infinitely-distant object.

FIG. 7 is a lens cross section of a zoom lens according to a fourth exemplary embodiment of the present invention at the wide-angle end. FIGS. 8A through 8C are aberration charts of the zoom lens according to the fourth exemplary embodiment at the wide-angle end, a middle focal length, and the telephoto end, respectively, when focusing on an infinitely-distant object.

Figure 9:
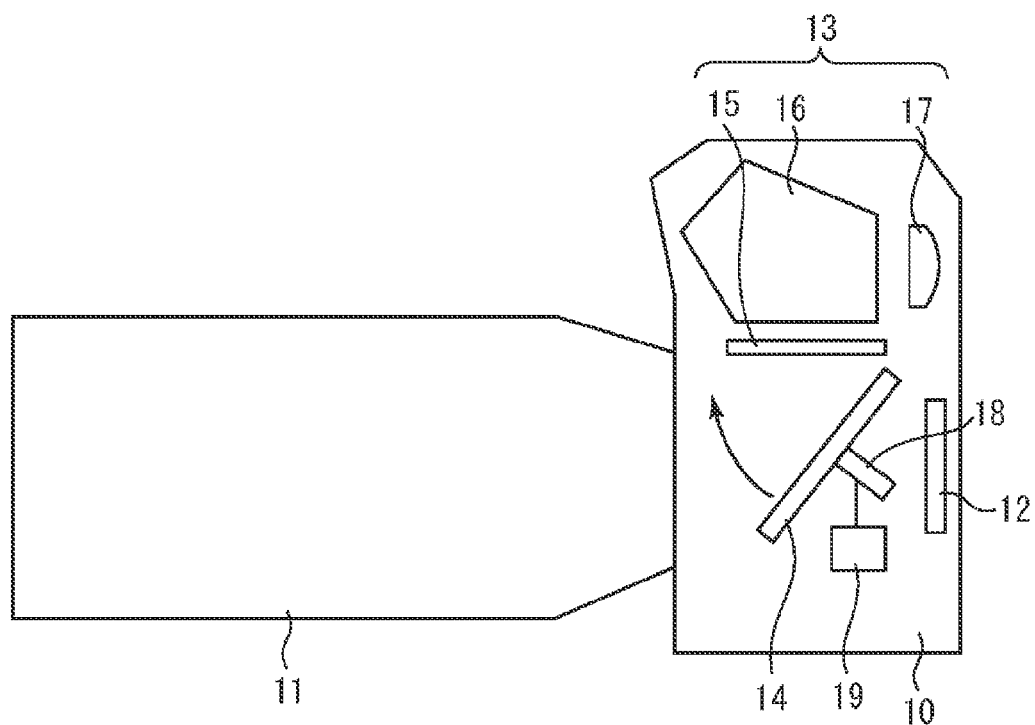
FIG. 9 illustrates main components of an example of an image pickup apparatus according to an exemplary embodiment of the present invention.

FIG. 9 illustrates main components of an example of a single-lens reflex camera (image pickup apparatus) according to an exemplary embodiment of the present invention.

The zoom lens according to each exemplary embodiment is a photographic lens system (optical system) used in an image pickup apparatus, such as a video camera, a digital camera, or a silver-halide film camera. In each of the diagrams showing a cross section of the zoom lens (FIGS. 1, 3, 5, and 7), an object side (front side) is shown at the left-hand portion of the figure, and an image side (rear side) is shown at the right-hand portion thereof.

If the zoom lens according to each exemplary embodiment of the present invention is used as a projection lens for a projector, in each of the diagrams showing a cross section of the zoom lens (FIGS. 1, 3, 5, and 7), the side of a screen s shown at the left-hand portion of the figure, and the side of an image to be projected is shown at the right-hand portion thereof.

In each of the diagrams showing a cross section of a zoom lens (FIGS. 1, 3, 5, and 7), "i" denotes the order of a lens unit from the object side and "Li" denotes the i-th lens unit. "SP" denotes an aperture stop (full F-number stop). "G2N" denotes a negative lens (optical element) included in the second lens unit L2. "G3P" denotes a positive lens (optical element) included in the third lens unit L3. "IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film (photosensitive) surface.

In each of the aberration charts (FIGS. 2A through 2C, 4A through 4C, 6A through 6C, and 8A through 8C), "d" and "g" respectively denote d-line and g-line light. "ΔM" and "ΔS" respectively denote a meridional image plane and a sagittal image plane. Chromatic aberration of magnification is represented with g-line light. "Fno" denotes an F-number, and "ω" denotes a half angle of view.

In each of the following exemplary embodiments, each of the wide-angle end and the telephoto end refers to a zooming position when a lens unit for varying magnification is positioned at each of the ends of a range in which the magnification varying lens unit can mechanically move along an optical axis.

The zoom lens according to each exemplary embodiment of the present invention includes, in order from the object side to the image side, a first lens unit L1 having a negative refractive power, a second lens unit L2 having a positive refractive power, a third lens unit L3 having a negative refractive power, and a fourth lens unit L4 having a positive refractive power.

It is also useful if a lens unit having a refractive power, such as a converter lens or an a focal lens unit, is located at least one of the object side of the first lens unit L1 and the image side of the fourth lens unit L4.

During zooming from the wide-angle end to the telephoto end, each of the first lens unit L1 through the fourth lens unit L4 moves on an optical axis as indicated with an arrow in each lens cross section to vary an interval between every adjacent ones of the lens units L1 through L4.

More specifically, in each exemplary embodiment, an interval between every adjacent ones of the lens units L1 through L4 can vary in the following manner during zooming from the wide-angle end to the telephoto end.

An air interval between the first lens unit L1 and the second lens unit L2 becomes smaller, an air interval between the second lens unit L2 and the third lens unit L3 becomes larger, and an air interval between the third lens unit L3 and the fourth lens unit L4 becomes smaller at the telephoto end than at the wide-angle end.

During zooming, the first lens unit L1 moves along a locus convex towards the image side. The second lens unit L2 through the fourth lens unit L4 move towards the object side.

The aperture stop SP moves integrally with the third lens unit L3 during zooming. With the above-described configuration, each exemplary embodiment has a retrofocus type refractive power arrangement for the entire lens system at the wide-angle end. Accordingly, the angle of view can be easily enlarged at the wide-angle end.

In each exemplary embodiment, the first lens unit L1 non-linearly moves during zooming. Thus, each exemplary embodiment corrects variation on the image plane that may occur due to variation of magnification. Focusing from an infinitely-distant object to a closest-distance object is executed by moving a lens subunit FG, which is a part of the second lens unit L2, towards the image side.

In each exemplary embodiment, an Abbe number and a relative partial dispersion of a material of the negative lens G2N (vd2N, θgF2N) and an Abbe number and a relative partial dispersion of a material of the positive lens G3P (vd3P, θgF3P) can satisfy the following conditions:

$$0.79 < \theta gF2N - (1.0 \times 10^{-4} \times vd2N^2 - 9.1 \times 10^{-3} \times vd2N) < 0.86 \quad (1)$$

$$10 < vd2N < 30 \quad (2)$$

$$0.79 < \theta gF3P - (1.0 \times 10^{-4} \times vd3P^2 - 9.1 \times 10^{-3} \times vd3P) < 0.86 \quad (3)$$

$$10 < vd3P < 30 \quad (4).$$

A relative partial dispersion θgF and an Abbe number vd of an optical material according to each exemplary embodiment can be defined by the following expressions:

$$\theta gF = (Ng - NF)/(NF - NC)$$

$$vd = (Nd - 1)/(NF - NC)$$

where "Ng", "NF", "Nd", and "NC" respectively denote the refractive indices of the material with respect to g-line, F line, d-line, and C-line light.

A material having a relative partial dispersion higher than that of a general optical material is used as the material of an optical element such as the negative lens G2N and the positive lens G3P.

Suppose here that the above-described optical element is used as a lens having a positive refractive power located at a position closer to the image side than the aperture stop SP. In this case, with respect to axial chromatic aberration, each exemplary embodiment can highly independently adjust the focusing position with respect to g-line light towards the undercorrection side while focusing positions with respect to C-line light and g-line light may otherwise be positioned at the overcorrection side. With respect to chromatic aberration of magnification, each exemplary embodiment can adjust the focusing position with respect to g-line light to the undercorrection side because the refractive index with respect to g-line light is higher than the refractive index with respect to C-line light.

On the other hand, if the above-described optical element is used as a lens having a negative refractive power located at a position closer to the object side than the aperture stop SP, each exemplary embodiment can correct axial chromatic aberration with respect to g-line light towards the overcorrection side and chromatic aberration of magnification with respect to g-line light towards the undercorrection side.

If the optical element is used alone, it is necessary to locate the optical element at a position on the optical path at which the heights of an paraxial object ray and a paraxial chief ray can be balanced, in consideration of the balance between axial chromatic aberration and chromatic aberration of magnification.

However, if the configuration of lens units of a zoom lens is limited and if the above-described optical element is located at the above-described position, then a primary spectrum of chromatic aberration may increase. Furthermore, if correction of the primary spectrum of chromatic aberration is prioritized, the arrangement of the optical element may be restricted. Accordingly, a secondary spectrum may not be sufficiently effectively corrected.

Each exemplary embodiment of the present invention uses two optical elements (lenses), namely, the positive lens G3P and the negative lens G2N as described above. The axial chromatic aberration correction effects of the two optical elements cancel each other out while effects of correcting chromatic aberration of magnification of the two optical elements are constructive. In other words, the effects of correcting chromatic aberration of magnification with respect to g-line light of the two optical elements are intensified towards the undercorrection side.

More specifically, if the refractive powers of the two optical elements are appropriately arranged, then both the primary spectrum and the secondary spectrum of chromatic aberration can be effectively corrected while compensating the otherwise low effect of correcting the secondary spectrum, which may occur due to the restriction of arrangement of refractive powers.

In order to correct chromatic aberration by using a zoom lens according to each exemplary embodiment, which includes, in order from the object side to the image side, the first through fourth lens units having negative, positive, negative, and positive refractive powers, it is useful to locate the above-described negative lens G2N in the second lens unit having a positive refractive power and locate the above-described positive lens G3P in the third lens unit having a negative refractive power.

The height of incidence of a paraxial chief ray into the second lens unit L2 and the third lens unit L3 is low. Accordingly, if each of the second lens unit L2 and the third lens unit L3 is used alone, the secondary spectrum cannot be effectively corrected. Each exemplary embodiment uses the above-described two optical elements, namely, the negative lens G2N and the positive lens G3P to effectively and balancedly correct the secondary spectrum of axial chromatic aberration and chromatic aberration of magnification. In addition, each exemplary embodiment can increase the effect of correcting the primary spectrum by using the above-described material as the material of the optical element having a refractive power of a sign opposite to the sign of the refractive power of the lens unit.

Moreover, each exemplary embodiment uses the negative lens G2N, which has a relative partial dispersion and an Abbe number that can satisfy the conditions (1) and (2) in the second lens unit L2 having a positive refractive power. Furthermore, each exemplary embodiment uses the above-described positive lens G3P having a relative partial dispersion and an Abbe number satisfying the conditions (3) and (4) in the third lens unit L3 having a negative refractive power.

Now, the technical significance of each of the above-described conditions will be described in detail below.

The conditions (1) and (2) each provide a condition for the relative partial dispersion of the optical performance of the negative lens G2N and the positive lens G3P.

If a lens whose optical performance is much different from that of a general optical material, then a wavelength-dependent curve on the short-wavelength side on a lens surface thereof may be extremely bent. In order to cancel the extreme bend, it becomes necessary to increase the refractive powers of other lenses. As a result, the amount of spherical aberration, coma, and astigmatism may increase too much to be corrected.

If the upper limit values of the conditions (1) and (3) are exceeded, then the secondary spectrum of axial chromatic aberration may be overcorrected. On the other hand, if the lower limit values of the conditions (1) and (3) are exceeded, then the axial chromatic aberration may not be effectively corrected.

The conditions (2) and (4) each provide a condition for the Abbe number of the material of the negative lens G2N and the positive lens G3P, respectively.

If a high-dispersion material, whose absolute value of an Abbe number is small, is used as a lens material, the amount of variation of refractive power for reducing chromatic aberration to a sufficiently low level becomes small. In this case, chromatic aberration can be effectively corrected without considerably increasing spherical aberration, coma, and astigmatism, which is useful in terms of the aberration theory.

It is particularly useful, in effectively correcting the primary spectrum, to use a material having a small Abbe number as the material of the positive lens G3P in the third lens unit having a negative refractive power.

If the Abbe number of the material of the negative lens G2N or the positive lens G3P exceeds the upper limit value of the condition (2) or (4), then the primary spectrum cannot be effectively corrected. Accordingly, the amount of variation of chromatic aberration that may occur due to variation of magnification may increase. On the other hand, if the lower limit value of the condition (2) or (4) is exceeded, then the primary spectrum may be overcorrected.

It is further useful if the ranges of values in the conditions (1) through (4) are be altered as follows:

$$0.793 < \theta gF2N - (1.0 \times 10^{-4} \times vd2N^2 - 9.1 \times 10^{-3} \times vd2N) < 0.850 \quad (1a)$$

$$15 < vd2N < 28 \quad (2a)$$

$$0.793 < \theta gF3P - (1.0 \times 10^{-4} \times vd3P^2 - 9.1 \times 10^{-3} \times vd3P) < 0.850 \quad (3a)$$

$$15 < vd3P < 28 \quad (4a).$$

In each exemplary embodiment of the present invention, each component is configured in the above-described manner. Accordingly, each exemplary embodiment can implement a zoom lens having a wide angle of view and a high optical performance and capable of effectively correcting chromatic aberration.

In each exemplary embodiment of the present invention, it is further useful to satisfy at least one of the following conditions. More specifically, it is further useful if a focal length of the negative lens G2N (f2N), a focal length of the positive lens G3P (f3P), a focal length of the second lens unit L2 (f2), and a focal length of the third lens unit L3 (f3) can satisfy at least one of the following conditions:

$$-5.5 < f2N/f3P < -0.3 \quad (5)$$

$$-3.0 < f2N/f2 < -0.3 \quad (6)$$

$$-3.0 < f3P/f3 < -0.3 \quad (7).$$

Now, the technical significance of the conditions (5) through (7) will be described in detail below.

The condition (5) provides a condition for the relationship between refractive powers of the negative lens G2N of the second lens unit L2 and the positive lens G3P of the third lens unit L3.

If the value of the relationship between the refractive powers exceeds the upper limit value of the condition (5), then the refractive power of the negative lens G2N of the second lens unit L2 may become smaller than the refractive power of the positive lens G3P of the third lens unit L3. As a result, the amount of correction of chromatic aberration of magnification with respect to g-line light towards the overcorrection side or the amount of cancellation of axial chromatic aberration with respect to g-line light towards the overcorrection side may be reduced to an insufficient level. Accordingly, in this case, the secondary spectrum may be undercorrected.

On the other hand, if the value of the relationship between the refractive powers exceeds the lower limit value of the condition (5), then the refractive power of the negative lens G2N of the second lens unit L2 may become greater than the refractive power of the positive lens G3P of the third lens unit L3. As a result, the amount of correction of chromatic aberration of magnification with respect to g-line light towards the overcorrection side or the amount of cancellation of axial chromatic aberration with respect to g-line light towards the overcorrection side may increase to an excessively high level. Accordingly, in this case, the secondary spectrum may increase at the telephoto end in particular.

The condition (6) provides a condition for the ratio of the refractive power of the negative lens G2N to the refractive power of the second lens unit L2. The condition (7) provides a condition for the ratio of the refractive power of the positive lens G3P to the refractive power of the third lens unit L3.

If the value of the relationship between the refractive powers exceeds the upper limit values of the conditions (6) and (7), then the refractive power of each optical element may become smaller than the refractive power of each lens unit. As a result, the primary spectrum cannot be effectively corrected. Accordingly, in this case, the amount of variation of chromatic aberration that may occur due to variation of magnification may increase.

On the other hand, if the value of the relationship between the refractive powers exceeds the lower limit values of the conditions (6) and (7), then the refractive power of each optical element may become greater than the refractive power of each lens unit. As a result, the primary spectrum may be overcorrected.

In each exemplary embodiment, the ranges of values in the conditional expressions (5) through (7) can be altered as follows:

$$-3.0 < f2N/f3P < -0.5 \tag{5a}$$

$$-2.0 < f2N/f2 < -0.5 \tag{6a}$$

$$-2.0 < f3P/f3 < -0.5 \tag{7a}$$

In addition, it is useful to use a glass material as the optical material of the negative lens G2N and the positive lens G3P according to each exemplary embodiment. The amount of variation of refractive power of a glass material when heat is applied is small. Accordingly, if a glass material is used, a zoom lens having a high environmental resistance can be implemented.

In addition, if a glass material is used, the refractive power of the optical element itself can be increased. Accordingly, a high achromatic effect can be achieved.

However, the same effect as that of the present invention can be achieved if a material such as a resin material, which is a liquid material at the start of manufacture thereof but turns into a solid material by curing executed during manufacture, is used.

In addition, in each exemplary embodiment, it is useful if an Abbe number of a material of a positive lens (optical element) located adjacent (cemented with) the negative lens G2N in the second lens unit L2 (ν2P), an Abbe number of a material of a negative lens located adjacent the positive lens G3P in the third lens unit L3 (ν3N), the smaller one of the Abbe numbers ν2P and ν3N (νd1), and an Abbe number of one lens, of the negative lens G2N and the positive lens G3P, which is located adjacent the lens having the Abbe number νd1 (νdGNL) can satisfy the following condition:

$$10 < \nu d1 - \nu dGNL < 25 \tag{8}$$

By using a lens that can satisfy the condition (8) within the second lens unit L2 and the third lens unit L3, the curvature of a surface of a cemented lens can be provided with an appropriate shape. Accordingly, chromatic spherical aberration can be effectively corrected.

If the upper limit value or the lower limit value of the condition (8) is exceeded, then in respective cases, chromatic spherical aberration may be overcorrected or undercorrected.

Now, the lens configuration of each exemplary embodiment will be described in detail below.

In the first exemplary embodiment illustrated in FIG. 1, the negative lens G2N is located at a position closest to the object side in the second lens unit L2. In addition, the positive lens G3P is located at a position closest to the image side in the third lens unit L3.

The first exemplary embodiment uses a material that can satisfy the conditions (1) and (2) as the material of the negative lens G2N and a material that can satisfy the conditions (3) and (4) as the material of the positive lens G3P.

In addition, by appropriately setting the refractive power of the negative lens G2N and the positive lens G3P, the first exemplary embodiment can effectively correct both the primary spectrum and the secondary spectrum of axial chromatic aberration and chromatic aberration of magnification.

The lens configuration of each lens unit of the first exemplary embodiment will be described in detail below.

The first lens unit L1 includes four lenses, namely, in order from the object side to the image side, negative, negative, negative, and positive lenses. Accordingly, the first lens unit L1 has an intense negative refractive power. Therefore, it is useful, in correcting coma and curvature of field at the wide-angle end, to share the negative refractive power with a plurality of negative lenses.

The second lens unit L2 includes, in order from the object side to the image side, a cemented lens composed of a meniscus negative lens whose surface on the object side has a convex shape and a positive lens and a positive lens both of whose surfaces have a convex shape.

The third lens unit L3 includes, in order from the object side to the image side, a negative lens and a cemented lens composed of a negative lens both of whose surfaces have a concave shape and a positive lens both of whose surfaces have a convex shape.

The fourth lens unit L4 includes a cemented lens composed of a positive lens both of whose surfaces have a convex shape and a negative lens, a cemented lens composed of a negative lens and a positive lens, and a positive lens both of whose surfaces have a convex shape.

The second exemplary embodiment illustrated in FIG. 3 is different from the first exemplary embodiment illustrated in FIG. 1 in the following points. More specifically, in the present exemplary embodiment, the first lens unit L1 includes three lenses. In addition, in the present exemplary embodiment, a resin material is used as the material of the positive lens G3P of the third lens unit L3, and the third lens unit L3 includes a cemented lenses composed of three lenses, in which the positive lens G3P is sandwiched between two lenses made of glass material.

As the resin material, UV curable resin (nd=1.635, νd=22.7, θgF=0.69) and N-polyvinyl carbazole (nd=1.696, νd=17.7, θgF=0.69) can satisfy the above conditions (1) through (4). However, the resin material used in the present exemplary embodiment is not limited to this.

It is useful if the positive lens G3P, which is made of the above-described resin material, is sandwiched between lenses made of glass material, the degradation of optical performance, which may occur due to environmental variation, can be suppressed or reduced. Furthermore, if the positive lens G3P, which is made of the above-described resin material, is sandwiched between lenses made of glass material, it is useful for reducing the size of the entire optical system because the lens thickness can be more easily reduced than the case of using an optical material made of fluorite.

Furthermore, by using the negative lens G2N of the second lens unit L2 and the positive lens G3P of the third lens unit L3, both the primary spectrum and the secondary spectrum of axial chromatic aberration and chromatic aberration of magnification can be effectively corrected.

The lens configuration of each lens unit of the second exemplary embodiment will be described in detail below.

The first lens unit of the zoom lens according to the present exemplary embodiment includes, in order from the object side to the image side, a negative lens, a negative lens, and a positive lens. The second lens unit L2 of the zoom lens according to the present exemplary embodiment is the same as that of the first exemplary embodiment.

The third lens unit L3 includes, in order from the object side to the image side, a negative lens and a cemented lens composed of three lenses, namely, a negative lens, a positive lens, and a positive lens. The fourth lens unit L4 of the zoom lens according to the present exemplary embodiment is the same as that of the first exemplary embodiment.

The range of the focal length of the entire zoom lens system according to the third exemplary embodiment illustrated in FIG. 5 is short, which allows easily enlarging the angle of view. In the present exemplary embodiment, the lens configuration of each lens unit is intended to optimize the enlargement of the angle of view. The present exemplary embodiment is different from the first exemplary embodiment in the above-described points.

In the present exemplary embodiment, the negative lens G2N is located at a position closest to the object side in the second lens unit L2. The positive lens G3P is located at a position closest to the object side in the third lens unit L3.

The present exemplary embodiment uses a material that can satisfy the conditions (1) and (2) as the material of the negative lens G2N and a material that can satisfy the conditions (3) and (4) as the material of the positive lens G3P.

In addition, by appropriately setting the refractive powers of the negative lens G2N and the positive lens G3P, the present exemplary embodiment can effectively correct both the primary spectrum and the secondary spectrum of axial chromatic aberration and chromatic aberration of magnification.

The lens configuration of each lens unit of the third exemplary embodiment will be described in detail below.

The first lens unit L1 of the zoom lens according to the present exemplary embodiment includes, in order from the object side to the image side, three meniscus negative lenses whose surfaces on the object side have a convex shape, a negative lens both of whose surfaces have a concave shape, and a positive lens.

The second lens unit L2 includes a cemented lens composed of a negative lens and a positive lens. The third lens unit L3 includes a cemented lens composed of a positive lens and a negative lens and a negative lens. The fourth the lens unit L4 includes a positive lens and a cemented lens composed of a positive lens and a negative lens.

The range of the focal length of the entire zoom lens system of the fourth exemplary embodiment illustrated in FIG. 7 is longer than that of the first exemplary embodiment illustrated in FIG. 1 to achieve a long focal length. In addition, the lens configuration of each lens unit is optimized for achieving a long focal length. The present exemplary embodiment is different from the first exemplary embodiment in the above-described points.

In the present exemplary embodiment, the negative lens G2N is sandwiched between other two lenses of the three lenses constituting the second lens unit L2. The positive lens G3P is located at a position closest to the object side in the third lens unit L3.

The present exemplary embodiment uses a material that can satisfy the conditions (1) and (2) as the material of the negative lens G2N and a material that can satisfy the conditions (3) and (4) as the material of the positive lens G3P.

In addition, by appropriately setting the refractive powers of the negative lens G2N and the positive lens G3P, the present exemplary embodiment can effectively correct both the primary spectrum and the secondary spectrum of axial chromatic aberration and chromatic aberration of magnification.

The lens configuration of each lens unit of the fourth exemplary embodiment will be described in detail below.

The first lens unit L1 includes, in order from the object side to the image side, a negative lens, a positive lens, a negative lens, and a positive lens. The second lens unit L2 includes a cemented lens composed of three lenses, namely, a positive lens, a negative lens, and a positive lens, and a positive lens.

The third lens unit L3 includes a cemented lens composed of a positive lens and a negative lens and a negative lens. The fourth the lens unit L4 includes a cemented lens composed of a positive lens and a negative lens, a positive lens, and a negative lens.

With the above-described configuration, each exemplary embodiment of the present invention can reduce the variation of various aberrations that may occur during zooming and implement a zoom lens having a high optical performance in the entire zoom range.

Each exemplary embodiment of the present invention described above is not limited to the above-described configuration. More specifically, each exemplary embodiment of the present invention can be altered or modified within the scope of the present invention.

Numerical examples 1 through 4, which respectively correspond to the first through fourth exemplary embodiments of the present invention, are set forth below. In each of the numerical examples 1 through 4, "i" denotes the order of a surface from the object side, "ri" denotes a radius of curvature of the i-th optical surface (the i-th surface), "di" denotes a thickness of the optical member or an air interval between the i-th surface and the (i+1)th surface, "ndi" and "vdi" respectively denote a refractive index and an Abbe number of the i-th optical material with respect to d-line light. "BF" denotes a back focal length.

In addition, "k" denotes a conic coefficient, and each of "A4", "A6", "A8", "A10", and "A12" denotes an aspheric coefficient. The aspheric shape is expressed as $$X=(1/R)H^2/[1+\{1-(1+k)(H/R)^2\}^{1/2}]+A4H^4+A6H^6+A8H^8+A10H^{10}+A12H^{12}$$

where "X" denotes a displacement from a surface vertex along the optical axis in a position at a height "H" from the optical axis, and "R" denotes a paraxial radius of curvature. Furthermore, "e-X" denotes "$\times 10^{-X}$". In addition, the relationship between each condition described above and each numerical example is set forth in Table 1.

Numerical Example 1

| Surface data | | | | | |
|---|---|---|---|---|---|
| Surface No. | r | d | nd | vd | Effective diameter |
| 1* | 2220.533 | 2.30 | 1.77250 | 49.6 | 55.80 |
| 2 | 26.387 | 9.42 | | | 41.46 |
| 3 | 190.551 | 1.80 | 1.77250 | 49.6 | 40.81 |
| 4 | 29.275 | 0.16 | 1.51640 | 52.2 | 35.36 |
| 5* | 35.655 | 6.16 | | | 35.18 |
| 6 | −667.284 | 1.60 | 1.83481 | 42.7 | 35.21 |
| 7 | 117.224 | 0.15 | | | 34.77 |

-continued

| | | | | | |
|---|---|---|---|---|---|
| 8 | 45.216 | 4.50 | 1.76182 | 26.5 | 34.75 |
| 9 | 566.327 | Variable | | | 34.29 |
| 10 | 55.622 | 1.30 | 1.77071 | 23.0 | 25.58 |
| 11 | 24.529 | 6.20 | 1.56732 | 42.8 | 24.80 |
| 12 | −66.392 | 5.20 | | | 24.57 |
| 13 | 35.407 | 4.80 | 1.48749 | 70.2 | 25.79 |
| 14 | −80.072 | Variable | | | 25.61 |
| 15 (Stop) | ∞ | 1.90 | | | 21.59 |
| 16 | 154.396 | 1.40 | 1.88300 | 40.8 | 20.78 |
| 17 | 53.144 | 2.80 | | | 20.26 |
| 18 | −35.031 | 1.10 | 1.72000 | 42.0 | 20.22 |
| 19 | 21.873 | 5.50 | 1.77071 | 23.0 | 21.13 |
| 20 | −168.555 | Variable | | | 21.46 |
| 21 | 95.194 | 8.50 | 1.49700 | 81.5 | 24.04 |
| 22 | −18.837 | 1.20 | 1.80518 | 25.4 | 25.36 |
| 23 | −32.131 | 0.20 | | | 27.39 |
| 24 | 84.942 | 1.20 | 1.83400 | 37.2 | 29.47 |
| 25 | 25.051 | 6.95 | 1.49700 | 81.5 | 29.85 |
| 26 | −887.086 | 0.20 | | | 30.77 |
| 27 | 164.674 | 3.90 | 1.58313 | 59.4 | 31.56 |
| 28* | −63.133 | | | | 31.97 |

Aspheric Coefficients

| | | | | |
|---|---|---|---|---|
| r1 | K = −6.14998e+005 | A4 = 1.64530e−005 | A6 = −2.56325e−008 | |
| | A8 = 3.27955e−011 | A10 = −2.50611e−014 | A12 = 8.19429e−018 | |
| r5 | K = −2.94474e+000 | A4 = 2.66428e−005 | A6 = 3.64621e−009 | |
| | A8 = −1.47620e−010 | A10 = 4.25531e−013 | A12 = −4.57387e−016 | |
| r28 | K = −6.34166e+000 | A4 = −2.25920e−006 | A6 = 6.56535e−009 | |
| | A8 = −3.90111e−011 | A10 = 1.08556e−013 | A12 = −1.97563e−016 | |

Various Data

| | Wide-angle end | Middle zoom position | Telephoto end |
|---|---|---|---|
| Focal Length | 16.48 | 24.00 | 33.95 |
| F-number | 2.91 | 2.91 | 2.91 |
| Angle of View | 52.70 | 42.03 | 32.51 |
| BF | 40.19 | 48.95 | 60.02 |
| d9 | 31.47 | 12.74 | 2.10 |
| d14 | 0.93 | 4.95 | 10.14 |
| d20 | 13.04 | 9.02 | 3.83 |

Numerical Example 2

Surface data

| Surface No. | r | d | nd | νd | Effective diameter |
|---|---|---|---|---|---|
| 1* | 455.530 | 2.30 | 1.86400 | 40.6 | 51.39 |
| 2 | 20.073 | 13.55 | | | 35.81 |
| 3 | −81.107 | 1.60 | 1.74320 | 49.3 | 35.49 |
| 4* | 89.877 | 0.15 | | | 34.94 |
| 5 | 50.978 | 5.42 | 1.80518 | 25.4 | 35.00 |
| 6 | −589.375 | Variable | | | 34.38 |
| 7 | 61.266 | 1.30 | 1.77071 | 23.0 | 24.90 |
| 8 | 23.303 | 7.63 | 1.59270 | 35.3 | 25.25 |
| 9 | −81.899 | 5.66 | | | 24.40 |
| 10 | 43.348 | 5.33 | 1.48749 | 70.2 | 26.42 |
| 11 | −71.476 | Variable | | | 26.30 |
| 12 (Stop) | ∞ | 1.90 | | | 22.07 |
| 13 | −112.648 | 1.40 | 1.72047 | 34.7 | 21.70 |
| 14 | 106.600 | 1.70 | | | 21.51 |
| 15 | −52.807 | 1.10 | 1.63930 | 44.9 | 21.51 |
| 16 | 27.271 | 1.40 | 1.63555 | 22.7 | 22.30 |
| 17 | 53.606 | 3.40 | 1.84666 | 23.8 | 22.34 |
| 18 | −760.809 | Variable | | | 22.56 |
| 19 | 33.375 | 9.91 | 1.49700 | 81.5 | 27.27 |
| 20 | −26.821 | 1.20 | 1.74950 | 35.3 | 27.86 |
| 21 | −42.421 | 0.20 | | | 28.72 |
| 22 | 3964.053 | 1.25 | 1.80610 | 33.3 | 28.86 |
| 23 | 23.459 | 7.47 | 1.49700 | 81.5 | 29.01 |
| 24 | −748.165 | 0.20 | | | 29.91 |
| 25 | 66.530 | 3.90 | 1.58313 | 59.4 | 31.17 |
| 26* | −118.204 | | | | 31.43 |

Aspheric Coefficients

| | | | | |
|---|---|---|---|---|
| r1 | K = −1.38841e+003 | A4 = 1.65757e−005 | A6 = −2.69887e−008 | |
| | A8 = 3.64851e−011 | A10 = −2.96271e−014 | A12 = 9.78838e−018 | |
| r4 | K = 8.19383e+000 | A4 = 3.68153e−006 | A6 = −9.38663e−009 | |
| | A8 = −4.78362e−011 | A10 = 1.80423e−013 | A12 = −2.91528e−016 | |
| r26 | K = −3.02614e+001 | A4 = 5.70522e−006 | A6 = 5.29350e−009 | |
| | A8 = 1.45871e−011 | A10 = −9.90993e−015 | A12 = 3.53320e−017 | |

Various Data

| | Wide-angle end | Middle zoom position | Telephoto end |
|---|---|---|---|
| Focal Length | 16.40 | 23.99 | 34.00 |
| F-number | 2.88 | 2.87 | 2.87 |
| Angle of View | 52.84 | 42.04 | 32.47 |
| BF | 38.57 | 45.55 | 55.73 |
| d6 | 29.87 | 12.82 | 3.00 |
| d11 | 1.00 | 7.46 | 14.32 |
| d18 | 14.97 | 8.20 | 1.30 |

Numerical Example 3

Surface data

| Surface No. | r | d | nd | νd | Effective diameter |
|---|---|---|---|---|---|
| 1 | 45.885 | 3.00 | 1.80400 | 46.6 | 69.31 |
| 2 | 28.119 | 7.91 | | | 52.89 |
| 3 | 33.458 | 3.01 | 1.67790 | 55.3 | 50.93 |
| 4* | 17.299 | 10.23 | | | 44.27 |
| 5 | 74.848 | 2.57 | 1.86400 | 40.6 | 41.48 |
| 6* | 27.543 | 10.26 | | | 32.56 |
| 7 | −83.422 | 1.90 | 1.49700 | 81.5 | 31.34 |
| 8 | 33.814 | 0.20 | | | 29.50 |
| 9 | 29.796 | 5.54 | 1.72151 | 29.2 | 29.54 |
| 10 | −1043.851 | Variable | | | 28.90 |
| 11 | 36.410 | 1.14 | 1.77071 | 23.0 | 19.90 |
| 12 | 16.427 | 6.22 | 1.64769 | 33.8 | 19.76 |
| 13 | −107.140 | Variable | | | 19.93 |
| 14 (Stop) | ∞ | 2.00 | | | 19.82 |
| 15 | −190.500 | 4.12 | 1.77071 | 23.0 | 19.80 |
| 16 | −33.856 | 0.96 | 1.74950 | 35.3 | 19.92 |
| 17 | 354.522 | 1.81 | | | 20.00 |
| 18 | −29.852 | 1.00 | 1.80610 | 33.3 | 20.00 |
| 19 | −65.445 | Variable | | | 20.69 |
| 20* | 20.571 | 7.43 | 1.49700 | 81.5 | 24.68 |
| 21 | −53.662 | 0.17 | | | 25.08 |
| 22 | 53.796 | 1.05 | 1.88300 | 40.8 | 25.18 |
| 23 | 15.871 | 10.08 | 1.49700 | 81.5 | 24.12 |
| 24* | −43.974 | | | | 25.32 |

Aspheric Coefficients

| | | | | |
|---|---|---|---|---|
| r4 | K = −8.87625e−001 | A4 = −2.10974e−006 | A6 = −8.48428e−009 | |
| | A8 = −3.65611e−011 | A10 = 9.25731e−015 | A12 = 3.87310e−017 | |
| r6 | K = 1.08492e−002 | A4 = 1.16243e−005 | A6 = 3.07751e−008 | |
| | A8 = −1.74822e−011 | A10 = −2.83764e−014 | A12 = 7.85393e−016 | |

-continued

| | | | |
|---|---|---|---|
| R20 | K = −9.22194e−001 | A4 = −9.21994e−007 | A6 = 1.92302e−008 |
| | A8 = −7.96389e−011 | A10 = 1.66902e−013 | A12 = −1.44349e−016 |
| r24 | K = 1.54051e+000 | A4 = 1.90315e−005 | A6 = 1.26416e−008 |
| | A8 = 9.64841e−011 | A10 = −2.38273e−013 | A12 = 7.44288e−016 |

Various Data

| | Wide-angle end | Middle zoom position | Telephoto end |
|---|---|---|---|
| Focal Length | 14.00 | 17.67 | 23.07 |
| F-number | 2.88 | 2.88 | 2.88 |
| Angle of View | 57.09 | 50.76 | 43.17 |
| BF | 38.61 | 44.65 | 53.57 |
| d10 | 19.29 | 10.24 | 3.21 |
| d13 | 7.93 | 9.19 | 11.67 |
| d19 | 6.27 | 3.99 | 1.14 |

Numerical Example 4

Surface data

| Surface No. | r | d | nd | vd | Effective diameter |
|---|---|---|---|---|---|
| 1* | 91.161 | 2.60 | 1.48749 | 70.2 | 54.98 |
| 2 | 28.394 | 13.46 | | | 45.26 |
| 3 | −263.064 | 4.20 | 1.84666 | 23.8 | 44.28 |
| 4 | −75.860 | 2.63 | | | 43.68 |
| 5 | −50.199 | 2.10 | 1.79952 | 42.2 | 41.80 |
| 6 | 115.005 | 0.20 | | | 40.51 |
| 7 | 71.383 | 4.15 | 1.84666 | 23.8 | 40.52 |
| 8 | 170.753 | Variable | | | 39.89 |
| 9* | 250.225 | 4.05 | 1.88300 | 40.8 | 36.02 |
| 10 | −103.616 | 1.70 | 1.77071 | 23.0 | 36.04 |
| 11 | 72.758 | 7.00 | 1.60562 | 43.7 | 35.97 |
| 12 | −80.725 | 7.43 | | | 36.07 |
| 13 | 45.517 | 4.75 | 1.48749 | 70.2 | 36.30 |
| 14 | 3558.622 | Variable | | | 36.15 |
| 15 (Stop) | ∞ | 2.10 | | | 31.03 |
| 16 | −4504.049 | 5.62 | 1.77071 | 23.0 | 30.58 |
| 17 | −36.928 | 1.30 | 1.62588 | 35.7 | 30.30 |
| 18 | 82.367 | 4.48 | | | 29.06 |
| 19 | −36.341 | 1.70 | 1.51742 | 52.4 | 29.04 |
| 20 | −132.578 | Variable | | | 29.88 |
| 21 | −372.439 | 7.86 | 1.49700 | 81.5 | 30.26 |
| 22 | −22.485 | 1.45 | 1.78470 | 26.3 | 30.62 |
| 23 | −37.313 | 0.50 | | | 32.19 |
| 24 | 72.991 | 5.97 | 1.77250 | 49.6 | 34.70 |
| 25 | −70.098 | 6.51 | | | 34.80 |
| 26* | −147.372 | 1.35 | 1.80610 | 40.9 | 32.53 |
| 27 | 113.648 | | | | 32.50 |

Aspheric Coefficients

| | | | |
|---|---|---|---|
| r1 | K = 5.44802e+000 | A4 = 1.74316e−006 | A6 = −4.72827e−011 |
| | A8 = 8.89776e−014 | A10 = 1.26813e−017 | A12 = 2.15164e−019 |
| r9 | K = 1.21930e+001 | A4 = −8.48349e−007 | A6 = 7.48665e−010 |
| | A8 = −3.43967e−012 | A10 = 8.47384e−015 | A12 = −9.28406e−018 |
| r26 | K = 8.47152e+000 | A4 = −2.74547e−006 | A6 = −1.96917e−009 |
| | A8 = 9.62289e−012 | A10 = −3.65822e−014 | A12 = 4.96356e−017 |

Various Data

| | Wide-angle end | Middle zoom position | Telephoto end |
|---|---|---|---|
| Focal Length | 36.00 | 51.97 | 68.00 |
| F-number | 2.88 | 2.88 | 2.87 |
| Angle of View | 31.00 | 22.60 | 17.65 |
| BF | 49.78 | 59.53 | 71.48 |
| d8 | 26.10 | 10.15 | 2.00 |
| d14 | 5.00 | 16.50 | 24.02 |
| d20 | 16.47 | 7.31 | 1.30 |

TABLE 1

| | Numerical Example | | | |
|---|---|---|---|---|
| Condition | 1 | 2 | 3 | 4 |
| (1) | 0.802 | 0.802 | 0.824 | 0.802 |
| (2) | 23.0 | 23.0 | 23.0 | 23.0 |
| (3) | 0.802 | 0.845 | 0.802 | 0.824 |
| (4) | 23.0 | 22.7 | 23.0 | 23.0 |
| (5) | −2.28 | −0.58 | −0.75 | −1.14 |
| (6) | −1.81 | −1.37 | −0.77 | −1.06 |
| (7) | −0.62 | −1.74 | −1.07 | −0.69 |
| (8) | 19 | 12.3 | 10.8 | 12.7 |

An exemplary embodiment of a single-lens reflex camera (image pickup apparatus) that uses, as a photographic optical system, a zoom lens (optical system) according to each exemplary embodiment of the present invention will be described below with reference to FIG. 9.

Referring to FIG. 9, the single-lens reflex camera includes a single-lens reflex camera body 10 and an exchangeable lens 21. The exchangeable lens 11 includes a zoom lens according to any of the first through fourth exemplary embodiments described above.

The single-lens reflex camera body 10 includes an image sensor (solid-state image sensor (recording unit)) 12, such as a CCD sensor or a CMOS sensor, configured to receive light forming an object image via the exchangeable lens 11.

The single-lens reflex camera body 10 further includes a viewfinder optical system 13, via which a user of the camera can observe an object image formed via the exchangeable lens 11. The single-lens reflex camera body 10 further includes a pivotable quick return mirror configured to transfer the object image formed via the exchangeable lens 11 to the recording unit 12 and the viewfinder optical system 13.

When the user of the camera observes the object image via the viewfinder, the object image formed on a focusing plate 15 via the quick return mirror 14 is converted into an erect image via a pentagonal prism 16 and then the erect image is magnified by an eyepiece optical system 17 to allow the user to observe the magnified object image.

During shooting, the quick return mirror 14 pivotably moves in a direction indicated with an arrow in FIG. 9. Thus, the object image is formed on and recorded by the recording unit 12. The single-lens reflex camera body 10 further includes a sub mirror 18 and a focus detection sensor 19.

By applying the zoom lens according to each exemplary embodiment of the present invention to an image pickup apparatus such as a single-lens reflex camera, an image pickup apparatus having a high optical performance can be implemented. The present invention can be applied to a single-lens reflex camera that does not include a quick return mirror.

With the above-described configuration, each exemplary embodiment of the present invention can implement a small-size zoom lens having a high optical performance, which is useful in a photographic optical system that uses a solid-state image sensor. Furthermore, each exemplary embodiment of the present invention having the above-described configuration can implement an image pickup apparatus having the above-described zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-223399 filed Sep. 1, 2008, which is hereby incorporated by reference herein in its entirety.

What is claimed is:

1. A zoom lens comprising, in order from an object side to an image side:
   a first lens unit having a negative refractive power;
   a second lens unit having a positive refractive power;
   a third lens unit having a negative refractive power; and
   a fourth lens unit having a positive refractive power,
   wherein an interval between every adjacent ones of the first through fourth lens units varies during zooming,
   wherein the second lens unit includes at least one negative lens,
   wherein the third lens unit includes at least one positive lens, and
   wherein an Abbe number and a relative partial dispersion of a material of the at least one negative lens (vd2N, θgF2N) and an Abbe number and a relative partial dispersion of a material of the at least one positive lens (vd3P, θgF3P) satisfy the following conditions:

$$0.79 < \theta gF2N - (1.0 \times 10^{-4} \times vd2N^2 - 9.1 \times 10^{-3} \times vd2N) < 0.86$$

$$10 < vd2N < 30$$

$$0.79 < \theta gF3P - (1.0 \times 10^{-4} \times vd3P^2 - 9.1 \times 10^{-3} \times vd3P) < 0.86$$

$$10 < vd3P < 30.$$

2. The zoom lens according to claim 1, wherein a focal length of the at least one negative lens (f2N) and a focal length of the at least one positive lens (f3P) satisfy the following condition:

$$-5.5 < f2N/f3P < -0.3.$$

3. The zoom lens according to claim 1, wherein a focal length of the second lens unit (f2), a focal length of the third lens unit (f3), a focal length of the at least one negative lens (f2N), and a focal length of the at least one positive lens (f3P) satisfy the following conditions:

$$-3.0 < f2N/f2 < -0.3$$

$$-3.0 < f3P/f3 < -0.3.$$

4. The zoom lens according to claim 1, wherein both materials of the at least one negative lens and the at least one positive lens are made of glass material.

5. The zoom lens according to claim 1, wherein an Abbe number of a material of a positive lens located adjacent the at least one negative lens in the second lens unit (ν2P), an Abbe number of a material of a negative lens located adjacent the at least one positive lens in the third lens unit (ν3N), the smaller one of the Abbe numbers ν2P and ν3N (vd1), and an Abbe number of one lens, of the at least one negative lens and the at least one positive lens, which is located adjacent the lens having the Abbe number vd1 (vdGNL) satisfy the following condition:

$$10 < vd1 - vdGNL < 25.$$

6. An image pickup apparatus comprising:
   the zoom lens according to claim 1, and
   a solid-state image sensor configured to receive an image formed by the zoom lens.

* * * * *